(12) United States Patent
Haven

(10) Patent No.: US 12,450,773 B2
(45) Date of Patent: Oct. 21, 2025

(54) METHOD AND SYSTEM FOR MANIPULATING A TARGET ITEM SUPPORTED ON A SUBSTANTIALLY HORIZONTAL SUPPORT SURFACE

(71) Applicant: Liberty Reach Inc., Clearwater, ID (US)

(72) Inventor: G. Neil Haven, Clearwater, ID (US)

(73) Assignee: Liberty Robotics Inc., Dexter, MI (US)

( * ) Notice: Subject to any disclaimer, the term of this patent is extended or adjusted under 35 U.S.C. 154(b) by 309 days.

(21) Appl. No.: 18/085,100

(22) Filed: Dec. 20, 2022

(65) Prior Publication Data

US 2023/0124076 A1    Apr. 20, 2023

Related U.S. Application Data

(63) Continuation-in-part of application No. 17/852,482, filed on Jun. 29, 2022, now Pat. No. 11,557,058, (Continued)

(51) Int. Cl.
*G06T 7/73* (2017.01)
*B25J 9/16* (2006.01)
*G06T 7/00* (2017.01)

(52) U.S. Cl.
CPC ............... *G06T 7/74* (2017.01); *B25J 9/1664* (2013.01); *B25J 9/1697* (2013.01); *G06T 7/0008* (2013.01); *G06T 2207/10028* (2013.01)

(58) Field of Classification Search
CPC ............ G06T 7/74; G06T 7/0008; G06T 2207/10028; B25J 9/1664; B25J 9/1697
See application file for complete search history.

(56) References Cited

U.S. PATENT DOCUMENTS 4,284,186 A    8/1981 Brouwer
5,400,896 A    3/1995 Loomer
(Continued)

FOREIGN PATENT DOCUMENTS

CN    214494704 U    10/2021
EP    2751748 B1    5/2019
(Continued)

OTHER PUBLICATIONS

European Patent Office, Extended European Search Report for European Patent Application No. 22736980.8 dated Sep. 30, 2024.
(Continued)

*Primary Examiner* — Wednel Cadeau
(74) *Attorney, Agent, or Firm* — Brooks Kushman P.C.

(57) ABSTRACT

A method and system for manipulating a target item supported on a substantially horizontal support surface supporting a configuration of substantially identical items are provided. The system includes at least one light source configured to illuminate at least one surface including a top surface of the items to obtain backscattered illumination. A volumetric sensor such as a 2-D/3-D sensor is configured to sense the backscattered illumination to obtain at least one depth image and at least one appearance image. At least one processor is configured to determine geometric information and appearance information from the images. The at least one processor is also configured to generate a plurality of hypotheses and surprisals of the information and to rank the hypotheses based on their surprisals. In one embodiment, the best hypothesis is selected and the item is manipulated or picked from a pallet by a vision-guided robot based on the best hypothesis.

32 Claims, 18 Drawing Sheets

Related U.S. Application Data which is a continuation of application No. 17/141,593, filed on Jan. 5, 2021, now Pat. No. 11,436,753, application No. 18/085,100, filed on Dec. 20, 2022 is a continuation-in-part of application No. 17/491,975, filed on Oct. 1, 2021, now Pat. No. 12,118,778, and a continuation-in-part of application No. 17/569,606, filed on Jan. 6, 2022, now Pat. No. 12,125,242.

(56) References Cited

U.S. PATENT DOCUMENTS

| | | |
|---|---|---|
| 8,493,496 B2 | 7/2013 | Freedman et al. |
| 9,493,316 B2 | 11/2016 | Girtman et al. |
| 9,630,320 B1 | 4/2017 | Konolige et al. |
| 9,630,321 B2 | 4/2017 | Bradski et al. |
| 10,049,443 B2 | 8/2018 | Bartos et al. |
| 10,239,701 B2 | 3/2019 | Wicks et al. |
| 10,315,866 B2 | 6/2019 | Yuvaraj et al. |
| 10,337,977 B1 | 7/2019 | Kuhn et al. |
| 10,369,698 B1 | 8/2019 | Islam et al. |
| 10,591,277 B2 | 3/2020 | Kallay et al. |
| 10,662,007 B2 | 5/2020 | Yuvaraj et al. |
| 10,776,949 B2 | 9/2020 | Haven et al. |
| 10,937,182 B2 | 3/2021 | Dou et al. |
| 11,029,713 B2 | 6/2021 | Haven et al. |
| 2008/0279423 A1 | 11/2008 | Zhang et al. |
| 2013/0329012 A1 | 12/2013 | Bartos et al. |
| 2015/0105892 A1* | 4/2015 | Townsend ............ B23P 19/041 700/98 |
| 2016/0089791 A1 | 3/2016 | Bradski et al. |
| 2016/0221187 A1 | 8/2016 | Bardski et al. |
| 2018/0061043 A1 | 3/2018 | Bartos et al. |
| 2018/0120218 A1 | 5/2018 | Shultis et al. |
| 2019/0262994 A1 | 8/2019 | Yuvaraj |
| 2019/0332084 A1 | 10/2019 | Haven |
| 2020/0086437 A1 | 3/2020 | Johnson et al. |
| 2020/0134860 A1 | 4/2020 | Haven et al. |
| 2020/0164531 A1 | 5/2020 | Wagner et al. |
| 2020/0234071 A1 | 7/2020 | Yuvaraj et al. |
| 2020/0361083 A1 | 11/2020 | Mousavian et al. |
| 2020/0394747 A1* | 12/2020 | Chatterjee ................ G06T 7/70 |
| 2020/0410712 A1 | 12/2020 | Haven et al. |
| 2021/0150760 A1 | 5/2021 | Haven et al. |
| 2021/0171283 A1 | 6/2021 | Deacon et al. |
| 2021/0239624 A1 | 8/2021 | Dalla Casa et al. |
| 2022/0203547 A1 | 6/2022 | Majumdar |
| 2022/0327736 A1 | 10/2022 | Haven et al. |
| 2023/0120831 A1 | 4/2023 | Haven |

FOREIGN PATENT DOCUMENTS

| | | |
|---|---|---|
| WO | 2022150280 A1 | 7/2022 |
| WO | 2023083848 A1 | 5/2023 |

OTHER PUBLICATIONS

International Searching Authority, Mail Stop PCT, International Search Report and Written Opinion for related International Application No. PCT/US23/84843 dated Apr. 15, 2024.

Mail Stop PCT, Attn: ISA/US, Commissioner for Patents, International Search Report and the Written Opinion of the International Authority for International Application No. PCT/US2023/36873 mailed Feb. 27, 2024.

International Searching Authority, Mail Stop PCT, International Search Report and Written Opinion for related International Application No. PCT/US23/84820 dated May 22, 2024.

International Searching Authority, Mail Stop PCT, International Search Report and Written Opinion for corresponding International Application No. PCT/US23/84993 dated May 22, 2024.

Notice of Allowance for U.S. Appl. No. 18/085,307, dated May 13, 2025, 41 pages.

Notice of Allowance for U.S. Appl. No. 18/085,225, dated May 19, 2025, 43 pages.

Non-Final Office Action dated Jun. 3, 2025 for U.S. Appl. No. 18/085,474, 46 pages.

Non-Final Office Action dated Jun. 9, 2025 for U.S. Appl. No. 18/085,412, 43 pages.

* cited by examiner

METHOD AND SYSTEM FOR MANIPULATING A TARGET ITEM SUPPORTED ON A SUBSTANTIALLY HORIZONTAL SUPPORT SURFACE

CROSS-REFERENCE TO RELATED APPLICATIONS

This application is a continuation-in-part of U.S. application Ser. No. 17/852,482 filed Jun. 29, 2022, which, in turn, is a continuation of Ser. No. 17/141,593 filed Jan. 5, 2021 (now U.S. Pat. No. 11,436,753). This application is also a continuation-in-part of U.S. application Ser. Nos. 17/491,975; and 17/569,606; filed on Oct. 1, 2021; and Jan. 6, 2022; respectively, the disclosures of all of the above-noted applications are hereby incorporated in their entirety by reference herein.

This application is related to the following applications filed on the same day as this application: METHOD AND SYSTEM FOR MANIPULATING A MULTITUDE OF TARGET ITEMS SUPPORTED ON A SUBSTANTIALLY HORIZONTAL SUPPORT SURFACE ONE AT A TIME, U.S. application Ser. No. 18/085,225; METHOD AND SYSTEM FOR DECANTING A PLURALITY OF ITEMS SUPPORTED ON A TRANSPORT STRUCTURE AT ONE TIME WITH A PICKING TOOL FOR PLACEMENT INTO A TRANSPORT CONTAINER, U.S. application Ser. No. 18/085,307; METHOD AND SYSTEM FOR QUICKLY EMPTYING A PLURALITY OF ITEMS FROM A TRANSPORT STRUCTURE, U.S. application Ser. No. 18/085,412; METHOD AND SYSTEM FOR EFFICIENTLY PACKING A TRANSPORT CONTAINER WITH ITEMS PICKED FROM A TRANSPORT STRUCTURE, U.S. application Ser. No. 18/085,451; and METHOD AND SYSTEM FOR OPTIMIZING POSE OF A PICKING TOOL WITH RESPECT TO AN ITEM TO BE PICKED FROM A TRANSPORT STRUCTURE, U.S. application Ser. No. 18/085,474.

TECHNICAL FIELD

At least one aspect of the present invention generally relates to methods and systems for manipulating a target item supported on a substantially horizontal support structure and, in particular, to such methods and systems which are machine vision-based.

OVERVIEW

In the field of materials handling, it is often desirable to move items from a pallet, carrier, or platform, to place them into another tote, conveyance or onto a platform for reassembly and further processing. These items are typically boxes or box-like items of varying volumes and weights that must be placed into a receptacle or onto a conveyor line, according to a set of rules that take account of features such as: size of the box-like item, size of the tool used to move the items, size of the destination tote, means of conveyance, or kind of box. Box types can vary widely. Possible differences include the type of partial opening in the tox top, shape of the box top, whether the box is plain cardboard, and whether the box has been printed. The present state of the art for material handling provides several options for moving such items.

In a manual (single-) box pick process, manual operators are presented with an assembly of box-like items from which the operators select individual items to move from a plane or other conveyance to a tote or other conveyance for further processing. A box pick process in which box-like items are moved from a first conveyance to a second conveyance, in which the second conveyance may contain more than one of the items, and in which multiple box-like items may be moved from the first to the second conveyance simultaneously, is a decanting process. In a single singulation system (aka a deshingling conveyor, see, for example, CN214494704(U), U.S. Pat. Nos. 4,284,186A and 5,400,896A), the task of separating boxes from one another while in motion along a conveyor system is performed by a series of mechanical sorting steps implemented by conveyor belts, mechanical filters, lever arms, variable-speed motors, and switches. Deshingling is the process of removing any overlap between boxes or box-like items and spacing the boxes in a regular fashion on a conveyor.

In an automated box picking process, such as is disclosed herein, the box handling is typically performed by a robot or other automated system.

Although the current state of the art can free humans from the aforementioned tasks, these tasks are still most easily accomplished by humans. Automated single box pick and decanting systems encounter positioning difficulties that humans can easily overcome. Some examples of these difficulties include but are not limited to the following. A human easily might recognize that a box position is tipped, rotated, or otherwise not in a preset location on the plane of boxes. A human may easily see the count and arrangement of box-like items that can be moved to a tote at one time, easily comparing the items available to be moved with the space available to be filled in a partially filled tote. Humans can quickly understand if one item overlaps another and still move said items. Humans can also recognize and adapt quickly, if a configuration of boxes differs from an accustomed configuration. All the above tasks can be difficult for an automated system.

Unfortunately, manual processes for box picking and decanting are repetitive and prone to burn-out and injury for human workers. For these reasons and more, flexible automated box handling systems deploy machine vision to take the place of human eyes. Manufacturing efficiency is improved by assigning humans supervisory roles, rather than manual duties. It is one of the goals of the present invention to automate box picking and decanting processes, to reduce injury, avoid labor shortages, improve reliability, and improve the efficiency of the process.

Singulation (aka deshingling) systems are expensive to implement, given the requirement for multiple mechanical components, and they are inefficient in their use of linear conveyor space. Singulation systems, moreover, only address part of the problem of manipulating items from one conveyance to another; they separate box-like items one from another, successfully unloading a pallet, for instance, but they are not designed to manipulate the items after singulating in the most simple and limited circumstances.

Prior automated single box picking or decanting systems are inflexible. Information about the arrangement and location of boxes must be predetermined by humans and fed to the systems through pre-defined parameters. These parameters must be set up in advance and do not allow for simple changes or the introduction of new boxes without training or additional configuration. If the pre-determined arrangement is subject to disruption, or if the arrangement is simply unknown beforehand, adaptive methods such as vision-guided robots must be used. The present invention discloses a system and method which removes the limitations of such prior systems.

Systems in the prior art that utilize machine vision rely on either Classical Image Processing or Machine Learning as described hereinbelow.

A. Classical Image Processing

Classical Image Processing is dependent on processing steps of Feature Extraction, Segmentation and Detection to obtain information regarding an item of interest as shown in FIG. 1. Feature extraction attempts to locate and extract features from a digital image. Segmentation processes use the extracted features to separate the foreground from the background to isolate the portion of an image with relevant data. The processes of feature extraction and segmentation may iterate to extract a final set of features for use in the detection phase. In the final detection phase, a classification, item recognition, or measurement is given based on the features in the foreground. These processes of Feature Extraction, Segmentation and Detection are performed by algorithms developed or parameterized based on the judgment and experience of trained human engineers as illustrated in FIG. 16. The process of developing or parameterizing algorithms is time-consuming and error-fraught; thus expensive.

B. Machine Learning

Alternatively, systems in the prior art that automate single box picking or decanting rely on some form of Machine Learning (ML) principles (FIG. 17) or Deep Learning (DL) principles (FIG. 18). These are modern approaches to interacting with unknown items. Machine Learning systems are implementations of generalized algorithms that can learn to detect and classify items based on a training set of data. Deep Learning systems, moreover, are capable of Feature Selection, Segmentation, and Detection of items, based on training sets of data. The training process for these systems often requires a large data set and consumes a significant amount of time (hours to days) to achieve reliable functionality. The advantage of machine learning approaches to image processing is that customized algorithms designed for feature extraction, segmentation, and detection do not need to be developed. The general learning algorithms of Machine Learning substitute for more specific algorithms from classical image processing.

Unfortunately, Machine Learning approaches suffers from significant drawbacks for materials handling automation. Problems with system opacity, overtraining, undertraining, difficulty of obtaining training sets, and the extended duration of the training phase are rife. The system must discover important image features during the training phase, but a properly designed training phase is not always practical. This is especially problematic in systems with thousands of potential training items, or in systems to which new items are added regularly.

Too little training (undertraining) will mean that a ML system does not have sufficient data for a trained set—it will miss important general rules. Too much training (overtraining) may cause degraded performance due to faulty generalizations in pattern recognition algorithms. Machine learning systems are notoriously opaque in their functioning, making them difficult to maintain and adapt.

An additional difficulty with ML approaches is accounting for new items to be added into the process. Any time a new item is introduced, or an existing item is changed, the system must be retrained for the new data.

U.S. Pat. No. 10,937,182 discloses a device for estimating the pose of an item based on correspondence between a data volume containing a data mesh based on a current frame captured by a depth camera and a reference volume containing a plurality of fused prior data frames.

U.S. Pat. No. 11,029,713 discloses a method and system for expanding the range of working environments in which a 3-D or depth sensor can operate without damaging or degrading the measurement performance of the sensor. The sensor has a rigid support structure and a plurality of optoelectronic components fixedly supported on the support structure. The system includes an enclosure for enclosing the support structure and the supported optoelectronic components within the interior of the enclosure. A temperature control circuit includes a controller to monitor interior temperature within the enclosure and to regulate temperature within the enclosure to be within an operational temperature range of the sensor, based on the monitored temperature.

U.S. Patent Publication No. 2020/0134860 discloses a machine vision-based method and system for measuring 3D pose of a part or subassembly of parts having an unknown pose. A number of different applications of the method and system are disclosed including applications which utilize a reprogrammable industrial automation machine such as a robot. The method includes providing a reference cloud of 3D voxels which represent a reference surface of a reference part or subassembly having a known reference pose. Using at least one 2D/3D hybrid sensor, a sample cloud of 3D voxels that represent a corresponding surface of a sample part or subassembly of the same type as the reference part or subassembly is acquired. The sample part or subassembly has an actual pose different from the reference pose. The voxels of the sample and reference clouds are processed via a matching algorithm to determine the pose of the sample part or subassembly.

Given a sensor system capable of measuring the pose of a rigid item in 3D space relative to the sensor, a secondary challenge arises, due to the need to match the coordinate system of a sensor system to the coordinate system of a robot or other manipulator. There is a rich literature and patent history regarding the determination of the intrinsic and extrinsic parameters of 2D sensors for photogrammetry in industrial, military, and civil engineering contexts. A modern example involves presenting multiple instances of a printed calibration pattern mounted upon a robot to a 2D sensor, which is thereby registered into the robot's coordinate system (see U.S. Pat. No. 10,369,698) and may henceforth interact with the robot using the robot's preferred coordinate system. Typical methods for registration of 2D sensors differ in kind from the registration of 3D volumetric sensors, in that the data used for registration does not include depth maps, so there are no Cartesian Coordinates directly available for registration. A point p in 3D Cartesian Coordinates is typically represented by listing its projections along the 3 coordinate axes: the x-axis, y-axis, and z-axis; for example: p={x, y, z}. Techniques for the registration of 3D volumetric sensors are known to the art; see, for example, U.S. Pat. No. 9,183,631B2. A preferred method for 3D sensor registration is described in U.S. application Ser. No. 17/569,606

U.S. Patent Publication No. 2021/0150760 discloses a machine vision-based method and system to facilitate the unloading of a pile of boxes within a work cell. The method includes the step of providing at least one 3-D or depth sensor having a field of view at the work cell. Each sensor has a set of radiation sensing elements that detect projected radiation to obtain 3-D sensor data. The 3-D sensor data includes a plurality of pixels. For each possible pixel location and each possible box orientation, the method includes generating a hypothesis that a box with a known structure appears at that pixel location with that container orientation to obtain a plurality of hypotheses. The method further includes ranking the plurality of hypotheses. The step of ranking includes calculating a surprisal for each of the hypotheses to obtain a plurality of surprisals. The step of ranking is based on the surprisals of the hypotheses.

The following U.S. patent publications are related to at least one embodiment of the present invention: 2016/0221187; 2018/0061043; 2019/0262994; 2020/0086437; 2020/0234071; U.S. Pat. Nos. 9,493,316; 9,630,320; 9,630,321; 10,239,701; 10,315,866; and 10,662,007.

The following U.S. patent documents assigned to the same assignee as the present application are related to at least one embodiment of the invention: 2013/0329012; 2018/0120218; U.S. Pat. No. 10,049,443; 2019/0332084; U.S. Pat. Nos. 10,591,277; 10,776,949; 2020/0410712; and U.S. Pat. No. 11,029,713.

SUMMARY OF EXAMPLE EMBODIMENTS

An object of at least one embodiment of the present invention is to provide a method and system which overcome the above-noted shortcomings of manual systems, semi-automated systems, and automated systems relying on Classical Image Processing and/or ML.

In carrying out the above object and other objects of at least one embodiment of the present invention, a method of manipulating a target item supported on a substantially horizontal surface supporting a configuration of substantially identical items aligned substantially perpendicular to the support surface is provided. The method includes gathering information about the configuration of items within a scene. The step of gathering includes the steps of illuminating at least one surface including a top surface of the items in the scene and sensing the irradiance of the scene to obtain at least one image of the geometry of the scene and at least one image of the appearance of the scene. The method also includes generating a plurality of hypotheses. Each of the hypotheses describe an observation of an item in the configuration. The observations include an observation of the appearance of the item and an observation of the geometry of the item. The method further includes ranking the hypotheses. The step of ranking includes the steps of computing a surprisal of the observation of the appearance of the item and a surprisal of the observation of the geometry of the item and the step of combining the surprisals for each hypothesis.

The step of illuminating the at least one surface may illuminate one or more side surfaces of the target item to obtain geometry and appearance images of the one or more side surfaces.

The step of illuminating may include the step of uniformly illuminating the at least one surface including the top surface of the item with light having an intensity within a relatively narrow range of wavelengths such that the light overwhelms the intensity of ambient light within the narrow range.

The step of illuminating may include the step of polarizing the light wherein the step of sensing senses unpolarized light and rejects the polarized light to obtain images of backscattered light.

The at least one image of the appearance of the scene may be determined from an albedo of the target item.

The step of sensing may be performed with a hybrid 2-D/3-D sensor.

The target item may be a box-like object such as a box or a large bag.

A pallet may have the support surface.

The step of generating may include the step of associating each element of a 3-dimensional matrix with a hypothesis regarding the presence of an item at the horizontal and vertical position, and an orientation angle determined by the coordinates of the element in the matrix.

The plurality of hypotheses may describe the observation of a printed pattern atop the item.

The plurality of hypotheses may describe the observation of the appearance of a vertical boundary of the target item.

The plurality of hypotheses may describe the observation of the geometry of a vertical boundary of the target item.

The step of ranking may include the steps of computing the surprisal of the observation of the appearance of the printed pattern atop the target item and combining the surprisal to the combined surprisals for the hypothesis.

The step of ranking may include the steps of computing the surprisal of the observation of the appearance of the vertical boundary of the target item and combining the surprisal to the combined surprisals for the hypothesis.

The step of ranking may include the steps of computing the surprisal of the observation of the geometry of the vertical boundary of the target item and adding the surprisal to the combined surprisals for the hypothesis;

The method may further comprise the step of selecting the hypothesis with the largest surprisal.

The step of selecting may include the steps of determining the location and orientation of the target item to be manipulated based on the selected hypothesis, wherein the method may further comprise the steps of providing an autonomous manipulator and a manipulating tool attached to the autonomous manipulator and utilizing the autonomous manipulator and the manipulating tool to manipulate the selected item based on the ranked hypotheses.

The autonomous manipulator may be vision-guided robot.

The method may further comprise determining printed pattern information which is based on a printed pattern in the at least one appearance image and located on the top or side surfaces of the target item.

At least one of the hypotheses may be based on the printed pattern wherein the step of ranking may include calculating printed pattern surprisals from the printed pattern information.

Further in carrying out the above object and other objects of at least one embodiment of the present invention, a system for manipulating a target item supported on a substantially horizontal support structure is provided. The system includes at least one light source configured to illuminate at least one surface including a top surface of the items in a scene to obtain backscattered illumination and a volumetric sensor having a field of view and configured to sense the backscattered illumination to obtain at least one depth image and at least one appearance image of the item in the scene, The system also includes at least one processor configured to determine depth information which is based on changes in depth in the at least one depth image and configured to determine grayscale information which is based on changes in brightness in the at least one grayscale image. The depth information and the grayscale information comprise first and second information sources, respectively. For each possible voxel location in the depth and grayscale images and each possible item orientation, the at least one processor is configured to generate a hypothesis that the item appears at that voxel location with that item orientation to obtain a plurality of hypotheses and is configured to rank the plurality of hypotheses. The at least one processor is configured to calculate surprisals from the depth and grayscale information for each of the hypotheses to obtain a plurality of surprisals from each information source. The at least one processor is configured to determine location of the item to be manipulated based on the ranked hypotheses.

The at least one light source may be configured to illuminate one or more side surfaces of the item to obtain depth and grayscale images of the one or more side surfaces.

The at least one processor may be configured to determine printed pattern information which is based on a printed pattern in the at least one grayscale image and located on the top or side surfaces of the item.

The item may be a box-like object such as a box or large bag.

The at least one light source may be configured to uniformly illuminate at least one surface including the top surface of the item with light having an intensity within a relatively narrow range of wavelengths such that the light overwhelms the intensity of ambient light within the narrow range to obtain the backscattered illumination.

The at least one light source may be a polarized light source wherein the sensor may include a polarization analyzer configured to reject polarized light and to pass unpolarized light.

The system may further comprise an autonomous manipulator registered with the sensor and a manipulating tool attached to the autonomous manipulator to manipulate the item based on the ranked hypotheses.

The autonomous manipulator may be a vision-guided robot.

At least one of the hypotheses may be based on the printed pattern wherein the at least one processor may be configured to calculate a printed pattern surprisal from the at least one hypothesis.

The sensor may be a hybrid 2-D/3-D sensor.

The at least one processor may be configured to compute rotation and position invariant albedo of the item based on the images wherein the brightness is the intrinsic brightness of the item.

A pallet may have the support surface.

Still further in carrying out the above object and other objects of at least one embodiment of the present invention, a method of picking an item supported on a transport structure is provided. The method relates to the picking of a single box-like item, said box-like item having a 'top' surface defining an 'up' direction for the box-like item, from a configuration containing a plurality of substantially identical box-like items each oriented with its 'up' direction substantially aligned perpendicular to a floor. The method includes the steps of: gathering information about a plurality of such items supported on a transport structure, generating a plurality of hypotheses supported by or opposed by said information, ranking said hypotheses by computing information-theoretic surprisals for relevant sources of information and selecting a desirable 'best' hypothesis from the ranked hypotheses. The desirable hypothesis defines the box-like item from the configuration of items to be picked by an autonomous manipulator such as a robot.

The step of gathering information may include the steps of illuminating at least one surface including a top surface of the items to obtain backscattered illumination and sensing the backscattered illumination to obtain at least one depth image describing the geometry of the configuration of said items and to obtain at least one grayscale image describing the appearance of the configuration of said items.

The step of generating the hypotheses may include the generation of a three-dimensional grid indexed by horizontal position, vertical position, and orientation angle. For each element of said grid a hypothesis is formed that an item is present at the element's position and orientation.

The step of ranking the hypotheses may include the selection of a series of observations to be made from the gathered information. The series of observations may include the observation of a grayscale perimeter corresponding to the grayscale perimeter of an item centered at the given position, with the given orientation. The series of observations may include the observation of a geometric perimeter corresponding to the geometric perimeter of an item centered at the given position, with the given orientation. Likewise, the series of observations may include the observation of a printed pattern associated with the item. If the relevant information has been gathered, the series of observations may include a vertical grayscale edge and a vertical geometric edge.

The step of ranking the hypotheses may include the step of computing surprisals for the observations that the item appears at the definite horizontal and vertical position, with the definite orientation, of each hypothesis. One such surprisal is computed for the observation of a grayscale perimeter, for the observation of a geometric perimeter, for the observation of a printed pattern, a vertical grayscale edge and a vertical geometric edge. For each hypothesis, the surprisals of the observations are added together. A first plurality of ranked hypotheses is created by sorting the hypotheses according to their surprisals' sums.

Yet, still further in carrying out the above object and other objects of at least one embodiment of the present invention, an automated method of picking a single box-like item from a collection of substantially identical box-like items supported on a pallet or other stack is provided. The method includes selecting one or more desirable hypotheses from ranked hypotheses. The hypothesis with the highest surprisal may be selected from a first plurality of ranked hypotheses. The selected hypothesis determines the position and orientation of the item to be picked.

The step of ranking may further include computing the top-surface's printed pattern surprisal from an albedo image instead of the grayscale appearance image.

Further in carrying out the above object and other objects of at least one embodiment of the present invention, a system for picking an item supported on a transport structure is provided. The system includes a light source configured to illuminate at least one surface including a top surface of the item to obtain backscattered illumination and a volumetric sensor having a field of view and configured to sense the backscattered illumination to obtain at least one depth image and at least one grayscale image of the item. The system also includes at least one processor configured to determine depth information which is based on changes in depth in the at least one depth image and configured to determine grayscale information which is based on changes in brightness in the at least one grayscale image. The depth and grayscale information comprise first and second information sources, respectively. For each possible voxel location in the depth and grayscale images and each possible item orientation, the at least one processor is configured to generate a hypothesis that the item appears at that voxel location with that item orientation to obtain a first plurality of hypotheses. The at least one processor is further configured to rank the first plurality of hypotheses. The at least one processor is configured to calculate surprisals from the depth and grayscale information for each of the hypotheses and each information source to obtain a plurality of surprisals. The plurality of surprisals is used to rank the first plurality of hypotheses. The at least one processor is configured to select an item or items to be picked based on the ranked first plurality of hypotheses.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Preferably, a 3-D or depth sensor 10 (FIG. 7) of at least one embodiment of the invention measures distance via massively parallel triangulation using a projected pattern (a "multi-point disparity" method). Measurements of distance are used to collect geometric information describing a scene. Preferably, the depth sensor 10 (FIG. 7) is fitted with one or more 2D sensors 30 enabling the simultaneous acquisition of appearance information (color or grayscale) along with the geometric information. The specific type of active depth sensor which is preferred is called a multipoint disparity depth sensor. A depth sensor configuration particularly suited to this invention is disclosed in patent application Ser. No. 17/491,975. Optional types of depth sensors likewise suitable for the purposes of the present invention are hybrid 2D/3D time-of-flight sensors, LIDAR sensors, and plenoptic sensors.

The "pose" of an object is the position and orientation of the object in space relative to some reference position and orientation. The location of the object can be expressed in terms of X, Y, and Z Coordinates. The orientation of an object can be expressed in terms of Euler angles describing its rotation about the x-axis (hereinafter RX), rotation about the y-axis (hereinafter RY), and then rotation about the Z-axis (hereinafter RZ) relative to a starting orientation. There are many equivalent mathematical coordinate systems for designating the pose of an object: position coordinates might be expressed in spherical coordinates rather than in Cartesian coordinates of three mutually perpendicular axes; rotational coordinates may be express in terms of quaternions rather than Euler angles; 4×4 homogenous, matrices may be used to combine position and rotation representations; etc. However, generally, six variables {X, Y, Z, RX, RY, RZ} suffice to describe the pose of a rigid object in 3D space.

Figure 3:
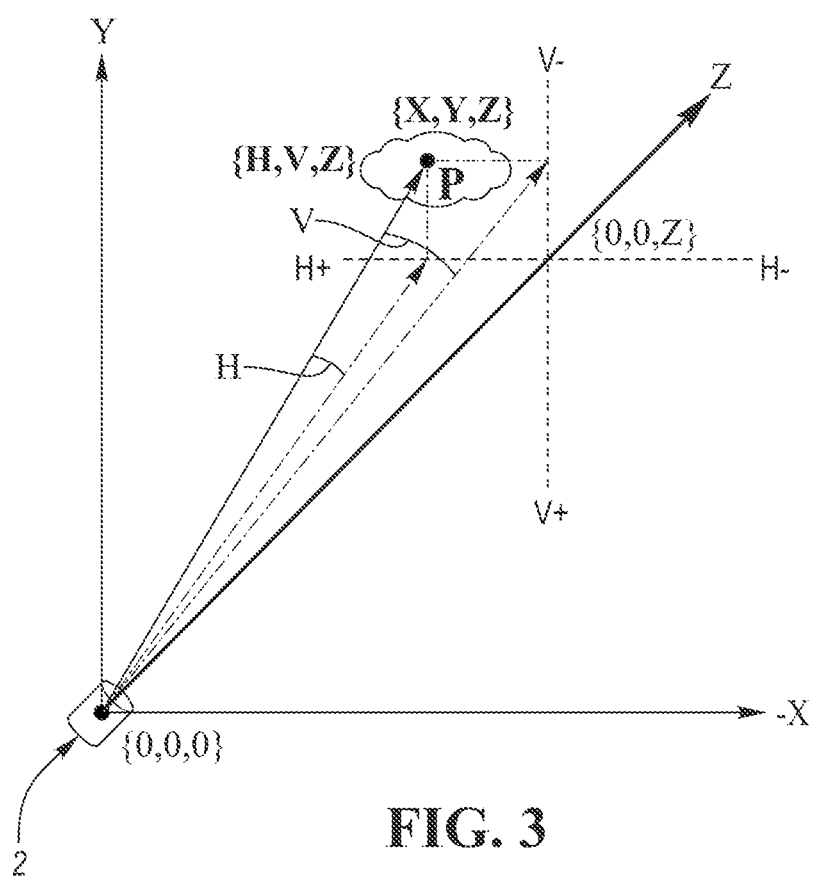
FIG. 3 is a graph showing the Cartesian coordinate system with an overlaid sensor (aka "perspective") coordinate system; a point in 3-space is determined by the three coordinates {X, Y, Z} in Cartesian coordinates: a point (i.e. the same point) in 3-space is determined by the three coordinates {H, V, Z} in sensor (perspective) coordinates; perspective coordinates bear a formal similarity to spherical coordinates in that the first two coordinates "H" and "V" are indicative of the exit angle of the ray pointing at a target point (related to latitude and longitude measurements in spherical coordinates)—the final coordinate "Z" is measured as a distance along a z-axis.

The grayscale or color images from 2D sensors are presented in 3D Projective Coordinates (aka Homogeneous Coordinates). Referring to FIG. 3 (and the sensor 2 shown therein), a 3D point p, represented by the triple {x, y, z} in Cartesian Coordinates, is represented in 3D Projective Coordinates as any quadruple p={dh, dv, dz, d}, where h=x/z and v=y/z and d≠0. The slope h is the "image row coordinate". The slope v is the "image column coordinate". Any two quadruples {$d_1h, d_1v, d_1z, d_1$} and {$d_2h, d_2v, d_2z, d_2$} are equal so long as $d_1$≠0 and $d_2$≠0. Since, by this definition of equality, the scale factor d is arbitrary, it is usually set to 1 and one writes p={h,v,z,1}, often omitted the trailing '1' where it is understood. It is a trivial matter to transform from Cartesian to Projective Coordinates, and vice-versa. Thus, with reference to FIG. 3, it is directly apparent that the six Euler coordinates of the pose of a rigid body {X, Y, Z, RX, RY, RZ}, where {RX, RY, RZ} refer to the rotations of the rigid body about the X-, Y- and Z-axes, respectively, are equivalent to the perspective coordinates {H,V.Z, RX, RY, RZ}. A fundamental difficulty for image processing when dealing with 2D sensors is that 'Z' coordinate is either unknown or difficult to compute. The advantage of 3D volumetric sensors is that the 'Z' coordinate is provided directly by the sensor.

"Multipoint" refers to the laser projector which projects thousands of individual beams (aka pencils) onto a scene. Each beam intersects the scene at a point.

"Disparity" refers to the method used to calculate the distance from the sensor to objects in the scene. Specifically, "disparity" refers to the way a laser beam's intersection with a scene shifts when the laser beam projector's distance from the scene changes.

"Depth" refers to the fact that these sensors are able to calculate the X, Y and Z coordinates of the intersection of each laser beam from the laser beam projector with a scene.

A "point cloud" is a collection of data representing a scene as viewed through a "vision" sensor. In three dimensions, each datum in this collection might, for example, consist of the datum's X, Y and Z coordinates along with the red, green and blue values for the color viewed by the sensor 10 at those coordinates. In this case, each datum in the collection would be described by six numbers. To take another example: on a flat plane, in two dimensions, each datum in the collection might consist of the datum's X and Y coordinates along with the monotone intensity measured by the sensor 10 at those coordinates. In this case, each datum in the collection would be described by three numbers.

As "Passive Depth Sensors" determine the distance to objects in a scene without affecting the scene in any way, they are pure receivers.

"Active Depth Sensors" determine the distance to objects in a scene by projecting energy onto the scene and then analyzing the interactions of the projected energy with the scene. Some active sensors project a structured light pattern onto the scene and analyze how long the light pulses take to return. Active depth sensors are both emitters and receivers.

The "Albedo" of an object is a measure of the amount of light scattered by an object (radiance), relative to the amount of incident light shone on the object (irradiance), and is indicative of the (intrinsic brightness) of an object. One distinguishes the tendency of an object to scatter incident light from the tendency of an object to reflect incident light. In alternative embodiments of the invention disclosed herein one takes measures to eliminate reflected incident light from scattered incident light. The albedo of an object can be likened to the signature of a person and can be used to identify the object.

For clarity, each sensor, generally indicated at 10, is preferably based on active monocular, multipoint disparity technology as a "multipoint disparity" sensor herein. This terminology of "multipoint disparity", though serviceable, is not standard. A preferred monocular (i.e. a single infrared camera) multipoint disparity sensor is disclosed in U.S. Pat. No. 8,493,496. A binocular multipoint disparity sensor, which uses two infrared cameras 34 to determine depth information from a scene, is also preferred, and is shown in FIG. 7.

Figure 5:
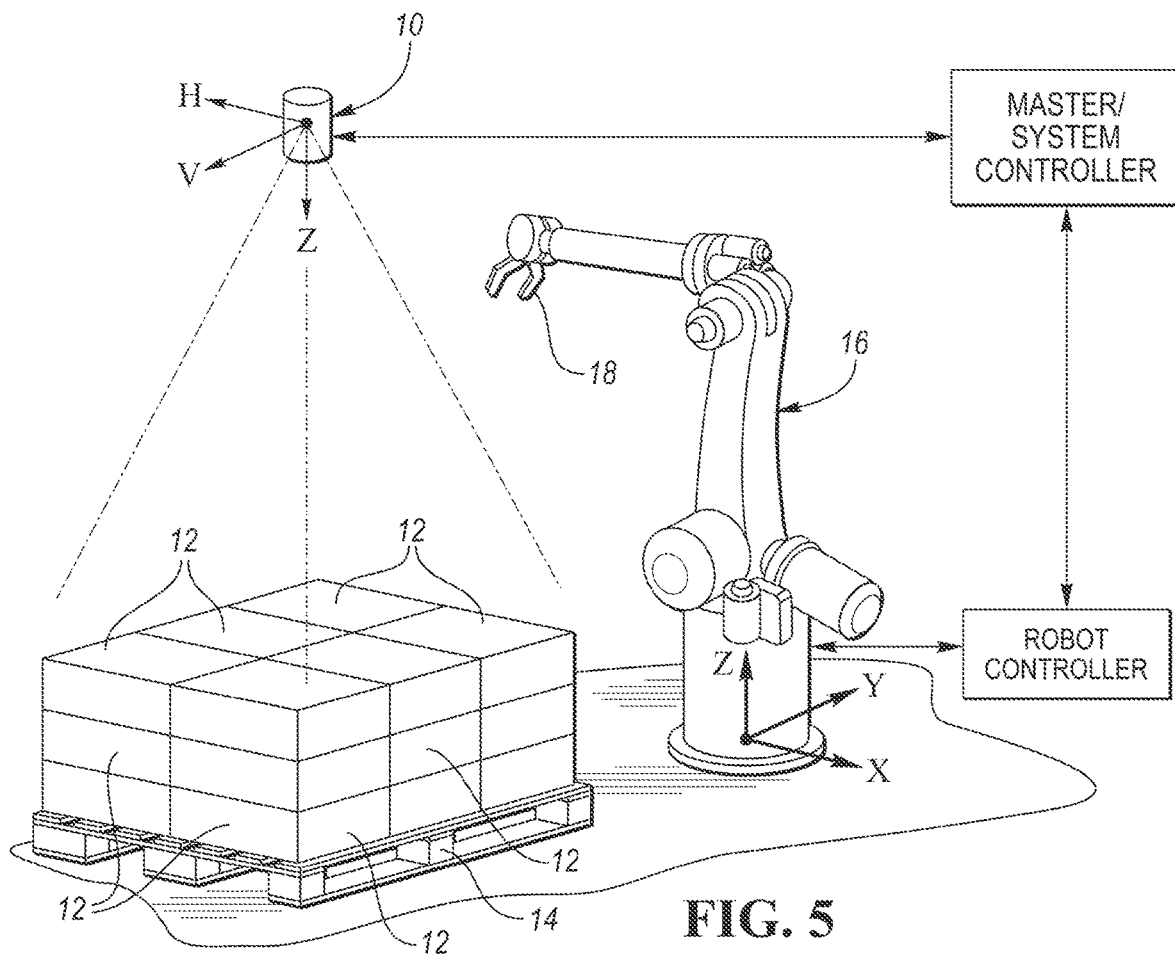
FIG. 5 is a schematic perspective view showing a robot and boxes on a pallet, with a volumetric sensor having a field-of-view, a sensor coordinate system, and a robot coordinate system; for registration purposes, the robot is configured to present a calibration target (such as a featureless plane) to the sensor at multiple target positions; the sensor is thereby taught to transform coordinates between its internal coordinate system and the robot's coordinate system, whereupon the sensor is able to measure the location and orientation of a top layer of boxes in the robot's coordinate system; in other words, after registration, the volumetric sensor is able to direct the robot to interact with boxes within the sensor's field of view.

The volumetric sensor 10 is placed above a multi-layer load of closely spaced box-like items 12 supported on a pallet 14 (FIG. 5). In an alternative embodiment, the volumetric sensor 10 is placed on a robot (not shown). The items 12 need not be boxes but may include bags. Each of these sensors 10 typically captures hundreds of thousands of individual points in space. Each of these points has a Cartesian position in space. Before measurement, the sensor 10 is registered into a common or world coordinate system as described below. This gives the present system the ability to correlate a location on the image of a sensor with a real-world position. When an image is captured from each sensor 10, pixel or brightness (i.e., intensity) information from a visible light camera 30 along with the depth information from the cameras 34, is converted by a computer into a collection of points in space, called a "point cloud".

Figure 7:
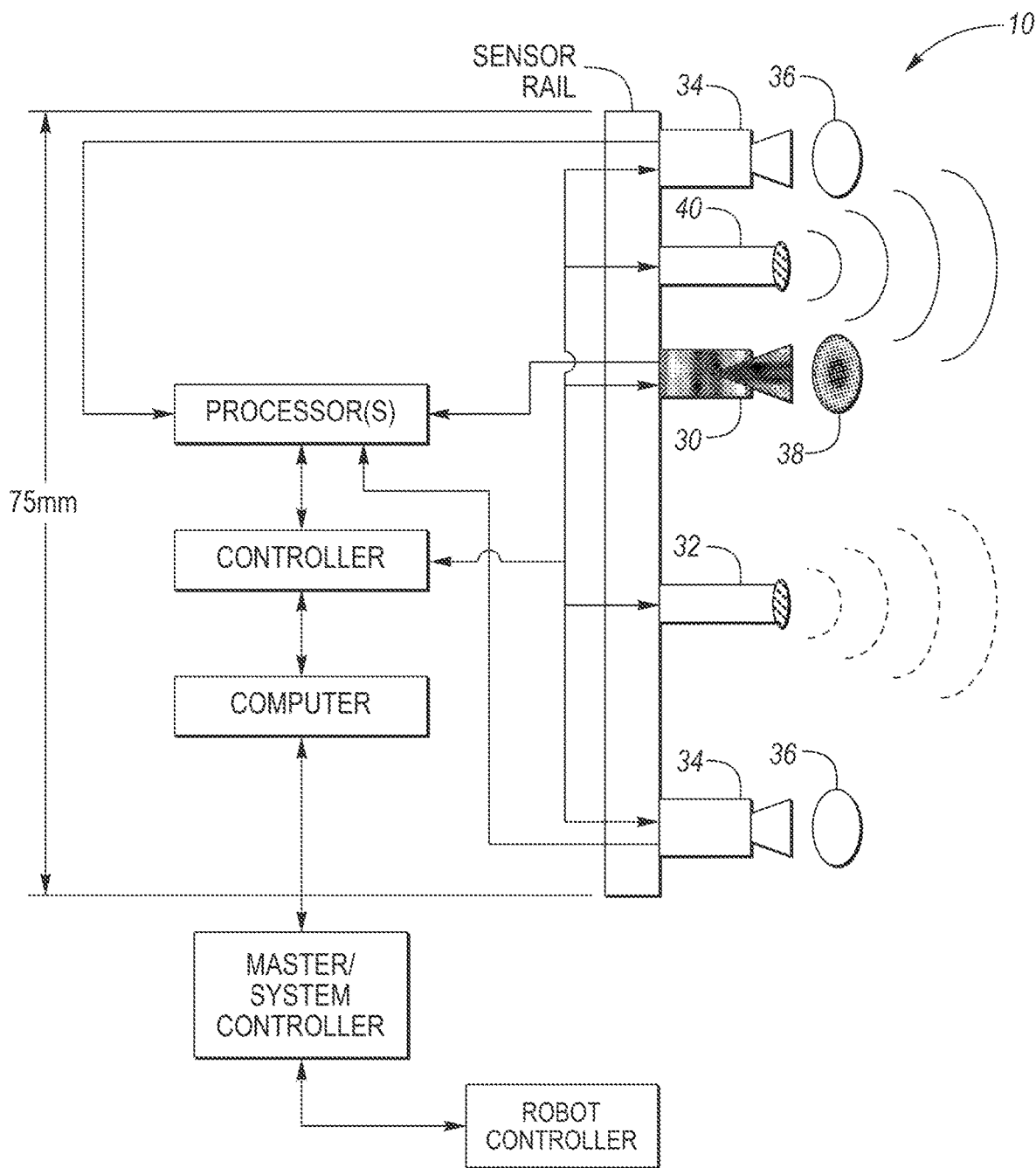
FIG. 7 is a schematic view of a sensor rail, a plurality of optoelectronic components supported thereon (34, 40, 30, 32, 34), a plurality of optical filters (36 and 38), one or more processors, a controller and a computer, all constructed in accordance with at least one embodiment of the present invention.

The 3-D or depth sensor 10 of FIG. 7 measures distance via massively parallel triangulation using a projected pattern (a "multi-point disparity" method). The specific types of active depth sensors which are preferred are called multipoint disparity, depth, or volumetric sensors.

The sensor 10 also preferably includes a dot pattern laser source in the form of a pattern projector or emitter 32 operating at wavelength, L1, and an emitter 40 configured to emit an even field of polarized light at a second wavelength or collection of wavelengths, L2, one or more array sensors in the form of the cameras or detectors 34 configured to receive light at the wavelength L1 and generate voxel arrays describing scene geometry, and a pixel array sensor 30 configured to receive light at the wavelength(s) L2. The infrared laser projector 32 operates by means of diffractive optical elements to project laser pencils or beams onto the scene to be analyzed. The detectors 34 analyze the scene at wavelength 'L1' to locate the intersections of the laser pencils with the scene and then use geometry to calculate the distance to points on the surface of box-like items 12 in the scene. The camera 30 in a preferred embodiment is used simultaneous with the operation of detectors 34 to associate a color or monochrome intensity to each portion of the analyzed image of a box-like item 12. This provides the ability to interpret a 'volumetric' image in what is traditionally referred to as two and a half dimensions. 2½ D in the present sense is distinguished from true 3D in the sense of tomography due to the sensor 10 only being able to detect item surfaces that are physically visible to it (i.e., it is unable to see through box-like items or to see surfaces on the far side of a box-like item).

In an alternative preferred embodiment, the detectors 34 and 30 are configured to operate at alternate times. At the first instance light from the pattern emitter 32 is observed by detectors 34; in the second instance light from the uniform source 40 is observed by detector 30. The electro-mechanical complexity of this alternative embodiment may be decreased by setting frequency L1 equal to frequency L2, eliminating sensor 30, and using the sensor(s) 34 for viewing both the illumination from 32 and the illumination from 40 at alternating times.

Before measurement, the sensor 10 is registered into a common or world coordinate system. This gives the present system the ability to correlate a location on the image of the sensor 10 with a real-world position addressable by a robot or other automated manipulator. When an image is captured from the sensor 10, the pixel information, along with the depth information, is converted by a computer (FIG. 7) into a point cloud. The collective point cloud data may be presented on a display screen (not shown) as a 3D graphic.

In one embodiment, each element 36 comprises a NIR bandpass filter centered at 830 nm; each 1280×960 array sensor 34 interprets a 60 degree×45 degree field of view; the uniform polarized source 40 is comprised by a 940 nm VCSEL array or LED operating as a flat field illuminator; the 1280×960 array sensor 30 observes a 60 degree×45 degree field of view through filter 38 which is an NIR bandpass and polarization filter centered at 940 nm; and the source 32 is a 830 nm Fabry-Perot laser diode fitted with a DOE element to generate a dot pattern with approximately 30,000 laser pencils.

Referring again to FIG. 7, the computer controls a controller which, in turn, controls at least one vision processor, the array sensor 30, the emitter (i.e. pattern source) 32, the uniform source 40 and the detectors 34 (i.e., array sensors) of the sensor 10.

If the sensor 10 provides its own illumination at a frequency and amplitude distinguishable from natural lighting, then the bandpass filter 38 ensures that sensor 10 can operate in the presence or absence of ambient visible light while also filtering undesired reflected light from desired scattered light. Ambient factory lighting conditions can vary widely from very bright to very dark. The robustness of a machine vision system is improved if it is not affected by ambient lighting changes.

The sensor 10 is configured to provide consistent and reliable voxel (geometric) information independent of ambient light as well as consistent and reliable pixel (appearance) information independent of ambient light. The consistent, ambient-immune pixel information enables the computation of surface albedo for matching algorithms as described in the above noted patent application Ser. No. 17/491,975.

By ensuring that the light source is even across its field-of-projection, at least one embodiment of the present invention ensures that there is no correlation between horizontal placement of a box-like item within a field-of-view and the surface's computed albedo. By employing geometric information obtained from the 3D sensor 10 to normalize diffuse (backscattered) brightness for distance and surface orientation, at least one embodiment of the present invention ensures that there is no correlation between distance or orientation of the box-like item 12 and its computed albedo. By utilizing polarized light and a polarization analyzer the at least one embodiment ensures that only the diffuse component of the light scattered from the observed top surface of the box-like item 12 is measured. This removes correlation between the glossiness of the top surface and its computed albedo. By projecting enough illumination in a narrow band to overwhelm ambient light in that band, along with a band-pass filter configured to reject light outside the narrow band, the at least one embodiment insures that computed surface albedo is not correlated with accidental features such as time of day (sunlight), surface orientation or distance, or ambient illumination.

Accurate sensor calibration and sensor registration is fundamental to the success of vision-guided automation. Sensor calibration, i.e. the determination of intrinsic sensor parameters, may be performed in a controlled laboratory environment before installation at a customer site. Methods for sensor calibration are well-known to the art.

Sensor registration, however, is the determination of extrinsic sensor parameters. Extrinsic parameters must be determined on site, where the environment is less controlled. As a practical matter, in such environments measurement noise tends to increase when compared with laboratory environments. There are multiple practical difficulties, frequently addressed in the prior art, with the use of depth information in the registration of volumetric sensors.

Figure 4:
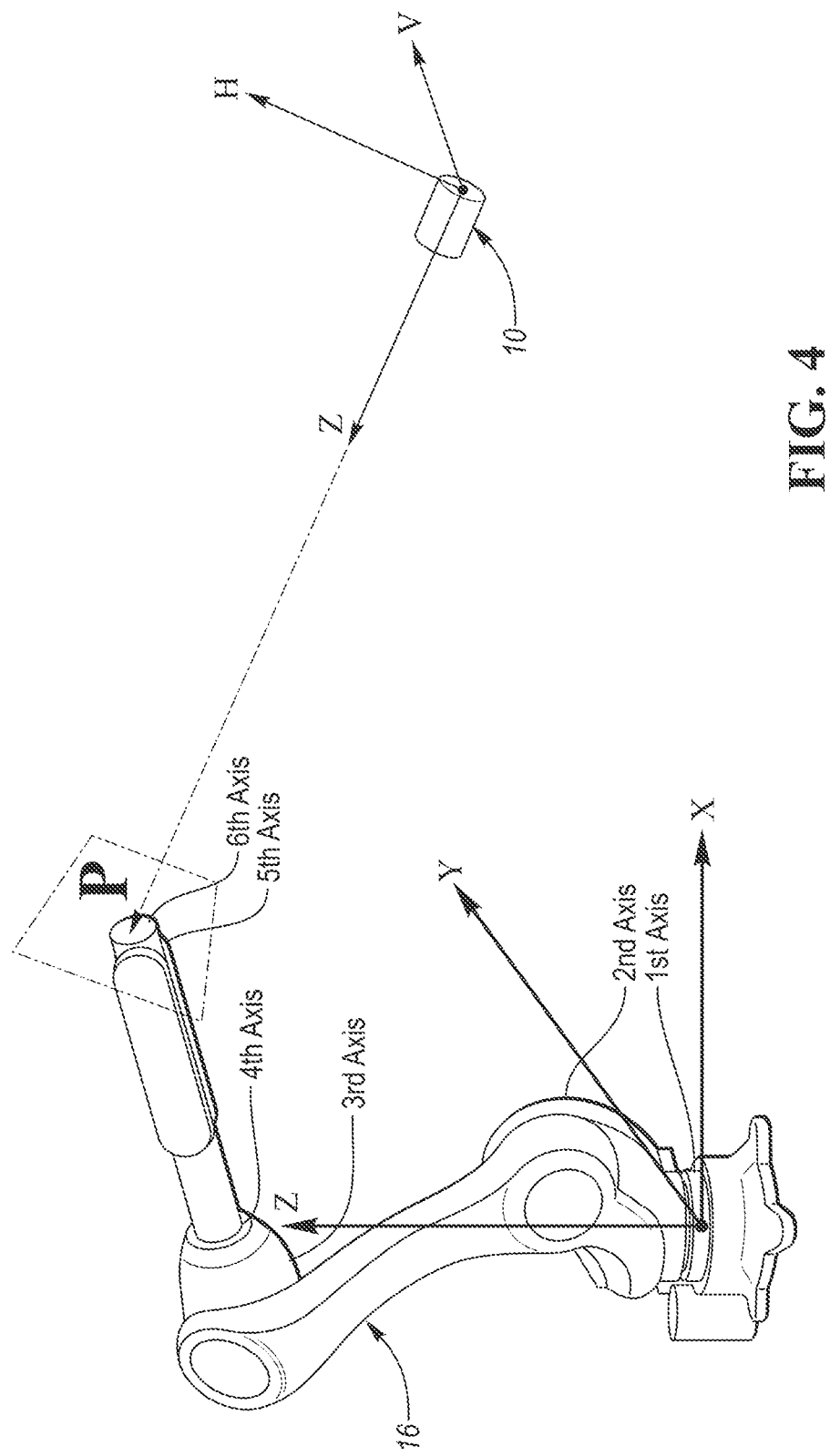
FIG. 4 is a combined schematic and graphical view showing a featureless plane, P, mounted on Joint 6 of an industrial robot, being presented to a volumetric sensor; during registration the plane is presented at multiple poses to the volumetric sensor, which measures the plane coordinates in the sensor's coordinate system and stores the measurements along with the coordinates of the plane as determined in the robot's coordinate system; by comparing multiple such stored relationships, the sensor is taught to transform coordinates between the sensor coordinate system and the robot coordinate system.

Referring again to the drawing figures, one preferred embodiment of the present invention described above registers the volumetric sensor 10 (i.e., 3D sensor) using a flat, featureless target, P, mounted on J6 (i.e., $6^{th}$ joint) of a robot 16 as shown in FIG. 4. Registration using this improved apparatus requires no human interaction during the registration stage. This method embodies a robust algorithm which is designed to optimize signal to noise ratios. The method is described in detail in patent application Ser. No. 17/569,606.

Sources of information are unified in a surprisal-based information theoretic framework so that they can be compared as commensurate quantities without using special parameters, in at least one embodiment of the present invention. This approach to image processing is generally described as follows. Generate information and form hypotheses. Rank how well each hypothesis matches the evidence. Select the 'best' hypothesis or hypotheses as the answer. This approach is probabilistic in nature and differs from classical image processing or Machine Learning approaches; see the block diagram flow chart of FIG. 2 and FIG. 8 then compare with FIGS. 1, 16, 17 and 18.

Box-like items 12 are presented on a pallet 14, as shown in FIG. 5. The items 12 lie flat on the top and parallel with the floor. The box-like items 12 are to be located so that the robot 16 can manipulate them. One assumes the boxes 12 are all flat and level.

One can use an orthogonal projection (a method well-known to those versed in the art) to virtually move the sensor image to a known height above the floor in the robot coordinate system. This allows one to eliminate 'z' (height) from the calculations since it is no longer unknown. Thus, one only needs to specify two position variables instead of 3. The following discussion relies upon the fact that, for a relatively flat and level collection of boxes or bags, only 3 dimensions are required to specify an item's location (2 positions and 1 rotation), instead of 6 dimensions (3 positions and 3 rotations). As a consequence, one speaks of 'hypotheses' with three parameters, although each such hypothesis corresponds to a unique item pose in 6 degrees of freedom.

Figure 1:
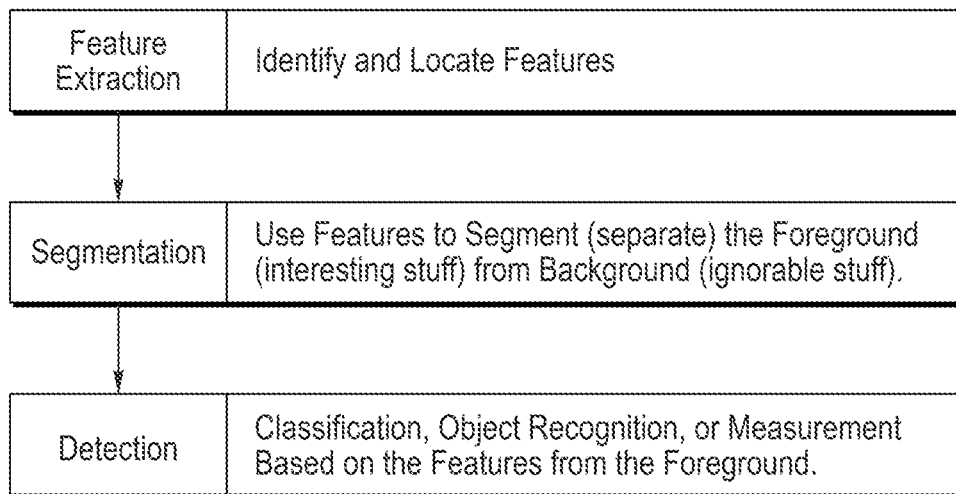
FIG. 1 is a block diagram flow chart which illustrates classical image processing.
Figure 2:
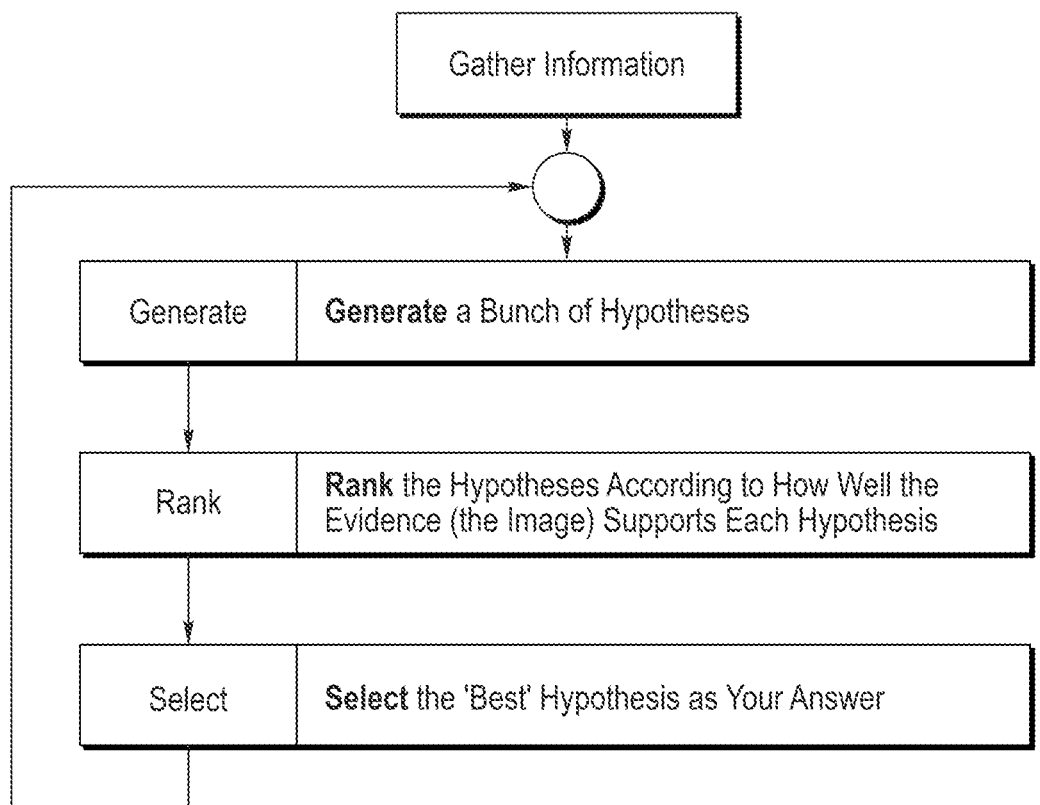
FIG. 2 is a block diagram flow chart which illustrates at least one embodiment of an iterative machine-vision based method.
Figure 6:
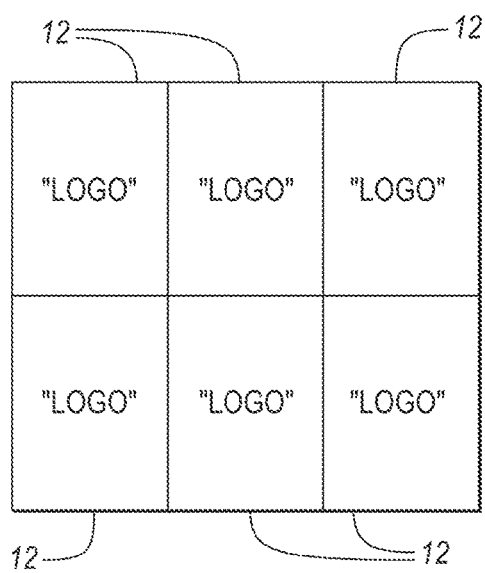
FIG. 6 is a top plan view of the palletized load of box-like objects of FIG. 5 printed with a "LOGO" similar to the view obtained from sensor 10 in FIG. 5.

Detection of box-like items 12 as shown in FIG. 5 and FIG. 6 offers an example application of the general method illustrated in FIG. 2:

[Generate the hypotheses] A box-like item 12 with known size, is located at some unknown (h) position with some unknown rotation about the vertical Z-axis 'a'. As illustrated in FIG. 3, the perspective coordinates (h,v,z) are directly related to the Cartesian coordinates (x,y,z). Thus, the six parameters of the box-like item's pose (x,y,z, RX, RY, RZ), described above, are equivalent to the six parameters (h, v, z, RX, RY, a). Since we assume the box-like items are approximately flat and level, we know the rotation of the box-like items 12 about the horizontal axes RX and RY is zero for the purposes of this invention. It is a simple matter, well-addressed in prior art, to determine the height 'z' of the top layer of box-like items. Thus, of the six pose parameters identifying the location and orientation of boxes on the top layer in FIG. 5, three are known or easily obtainable: (z, RX, RY). Three are unknown: (h,v,a). For every position (h, v) and every possible orientation (a), a hypothesis is generated that a box-like item is located with its centroid at (h,v), with orientation angle (a).

[Rank the hypotheses] For each hypothesis one calculates how improbable it is that the observed configuration of the data provided by the 3D and 2D sensors arose by chance: i.e., one computes the 'surprisal' of the hypothesis and ranks it against the other hypotheses.

[Select one or more hypotheses] One uses the ranked values of hypotheses to select, according to need, as described below, the highest ranked hypothesis, or, in other cases, several of the highest ranked hypotheses.

One advantage of the present invention over more common machine learning (FIG. 17) or deep learning (FIG. 18) approaches is that cumulative probability distributions for the computation of the surprisals described above serve as the sole data-dependent parameters in the method. These functions can be estimated quite well from a limited set of training data (as little as one exemplar serves in practice). Thus, the present method avoids the need for protracted system 'training' altogether.

The camera coordinates are {H,V,Z} perspective coordinates. Cartesian or world coordinates are {X,Y,Z}. Each world point can be referred to by either. FIGS. 4 and 5 illustrate this.

Figure 9:
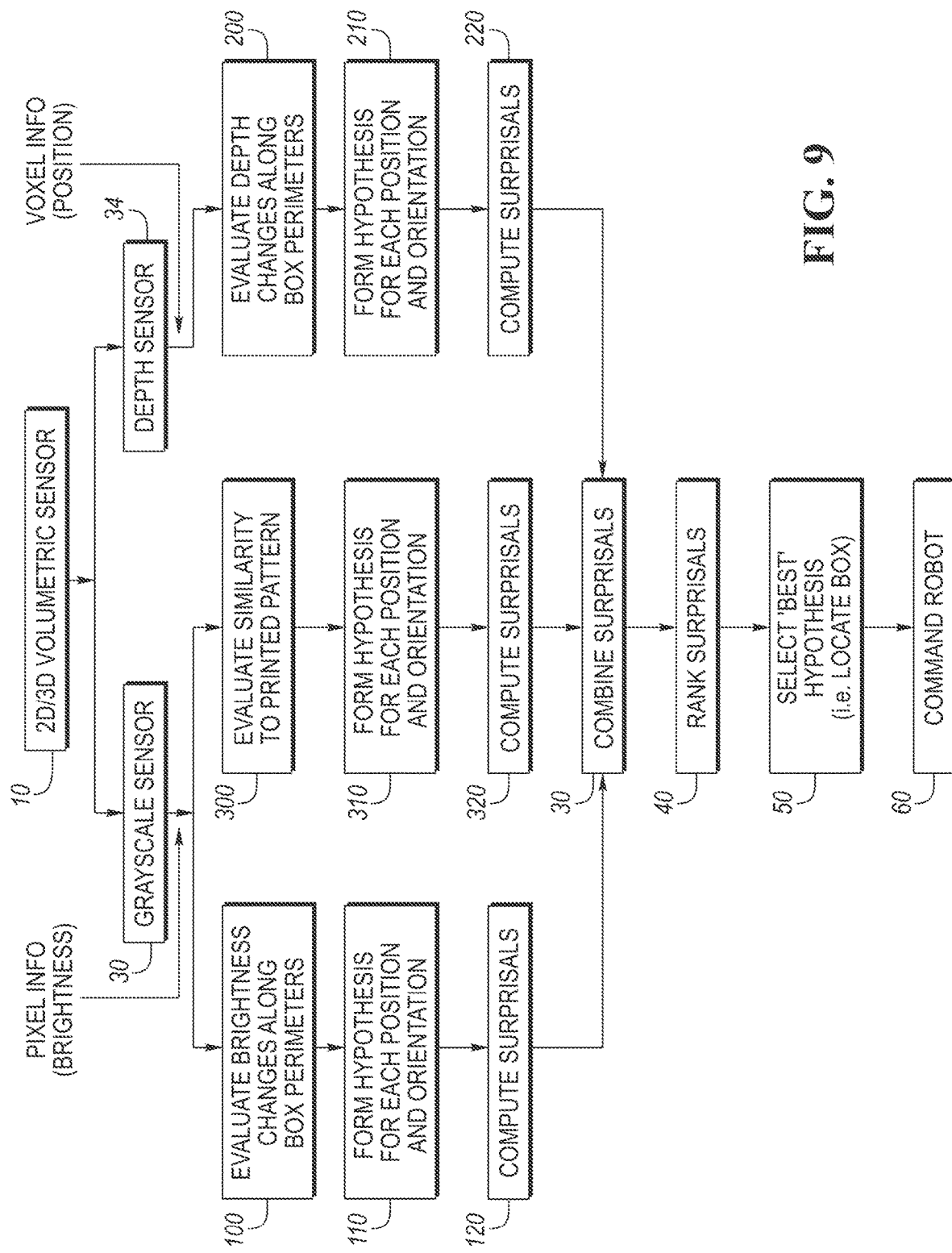
FIG. 9 is a block diagram flow chart illustrating at least one embodiment of the present invention.

The following are various stages or steps of an algorithm of at least one embodiment of the present invention to select a single box from a pallet of (nearly) identical boxes (FIG. 9). This embodiment serves to detail the principles used in other more complex embodiments described in the co-pending applications listed in the second paragraph in section titled cross-reference to related applications.

Stage 1: Generation of Information and Enumeration of Hypotheses

The enumeration of all the 3D hypotheses and the generation of relevant information is the first stage of the algorithm. A hypothesis is generated for each position and each rotation angle as described above.

If a particular style of item is being encountered for the first time, a cumulative probability distribution is collected from the observed data for each source of information via methods well-known to the art. This step may also require the collection of an exemplar of the appearance of the surface of the 'new' box-like item. It is worth mentioning that this step constitutes the whole of the training for the system. It is an unsupervised learning step easily performed in a fraction of a second.

Stage 2: The Ranking (Aka Evaluation) of Hypotheses is the Assignment of a Surprisal Value to Each Hypothesis.

Surprisal is a measure of the quantity of information derived from the probability of a particular event occurring. A "more surprising" an event, the more information it gives. In this instance, bigger numbers are better, more informative.

There are multiple independent sources of information for which one can compute surprisals. Three are illustrated in FIG. 9. In general, it is possible to combine multiple sources of information (more than 3) using the paradigm illustrated in FIG. 9:

1. Depth Perimeter Surprisals 200: Does the observed pattern of distance variation for each hypothesized box position and orientation duplicate the way that distances "fall-off" as they do at the perimeter of a box? (i.e. does the system observe a pattern with 'box-like' geometry along its perimeter? Quantify the surprisal of each observation. (See FIG. 6)
2. Grayscale Perimeter Surprisals 100: Does the observed pattern of grayscale variation for each hypothesized box position and orientation duplicate the way that grayscale levels "fall-off" as they do at the perimeter of a box? (i.e. does the system observe a pattern with 'box-like' appearance along its perimeter? Quantify the surprisal of each observation. (See FIG. 6)

These two information sources can function statistically independent of each other and each alone could reasonably locate a box 12. Together, they form a highly robust system where each gives independent verification of the other.

3. Printed Pattern Surprisals 300: Does the observed pattern of grayscale variation for each hypothesized box position and orientation duplicate the way that grayscale levels vary as they do away from the perimeter, within the interior of the surface of a box?

Quantify the surprisal of each observation. Since the box-like items may be shifted in (h,v) with respect to one another, as well as being rotated at some angle 'a' with respect to one another, the comparisons one makes when gathering the information above are performed in three dimensions. The degree of similarity must be assessed for each measurement, and that quantity must be converted to an information-theoretic surprisal. Methods for performing such assessment and transformations are known to the art. A preferred method for assessing similarity for the purpose of this disclosure is a three-dimensional convolution in (h.v.a), assessing 'shifts' in both horizontal (h) and vertical axes (v) as well as rotations (a)—though other methods will suggest themselves to those versed in the art.

The first surprisal computation in the algorithm is the depth perimeter surprisal 220: In the depth pattern one searches for the change in height along the outer perimeter of the target box 12.

The second surprisal computation in the algorithm is the grayscale perimeter surprisal 100: In the grayscale pattern one searches for the change in brightness along the outer perimeter of the target box 12.

The third surprisal computation in the algorithm 300 correlates against the printed grayscale pattern on the top surface of the target box 12:

Other sources of information may be gathered and combined with the aforementioned three sources: side-mounted sensors may observe the appearance of grayscale lines and geometric creases orthogonal (vertical) to the top surface, invisible to a top-mounted sensor, for example. These sources of information may be used to increase the reliability of the system in identifying box-like items, as required. One significant advantage of the information-theoretic approach to statistical image processing described herein is that additional sources of information are all treated equivalently within the paradigm—when combining information to determine the 'most surprising' configurations, the information is simply added without arbitrary weighing factors or other parameters.

In Stage 1, the system may have enumerated 1000 pix (H)×1000 pix (V)×360 degrees (A)=–360,000,000 hypotheses. Each hypothesis may require the evaluation of the surprisal of multiple measurements. In this case, one considers three. The evaluation of approximately 3×360,000,000=one billion surprisals is computationally challenging. In a preferred embodiment, a GPU is employed to perform the parallel computation of the surprisals of these hypotheses.

After computing the surprisals for each source of information, one combines the surprisals (block 30) and ranks the combined surprisals (block 40).

Stage 3: The Selection of Hypotheses (Block 50).

If there is just one type of box 12 on the pallet 14, and if only one box needs to be located for robotic manipulation, the selection phase is simple. One selects the hypothesis with the largest surprisal. The coordinates corresponding to this hypothesis are the coordinates that are used to pick the box 12.

If there is more than one size of a box 12 on a pallet 14, and if the number of potential box types is limited to a small (<4) number, a preferred embodiment creates hypotheses for each size of box 12. Then, one must compute the surprisals for each size of box 12. Finally, one selects the hypothesis with the largest surprisal of all box sizes and all position/orientations. Due to the amount of computation involved in this method, this method for dealing with 'mixed box' types is limited to a small number of potential boxes.

Figure 8:
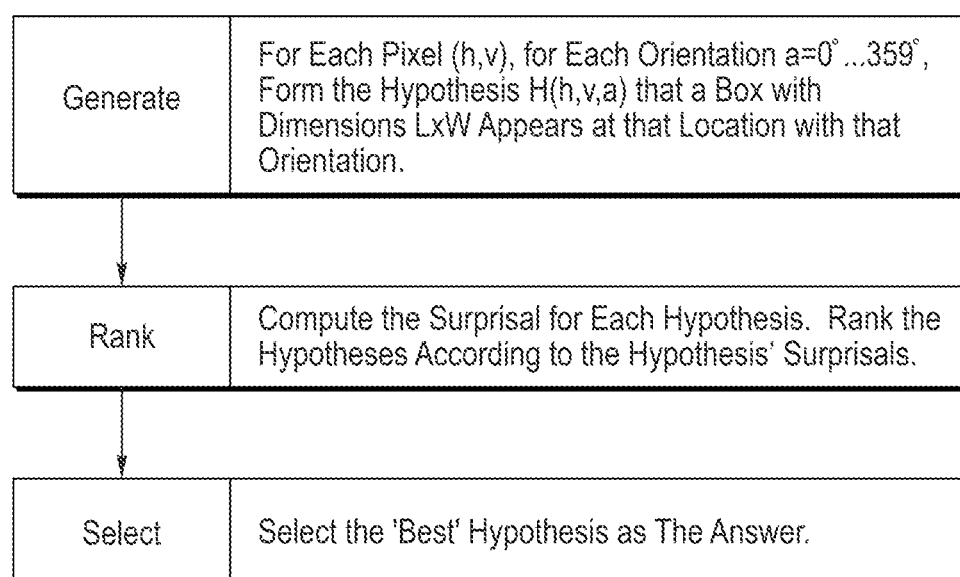
FIG. 8 is a block diagram flow chart, similar to the chart of FIG. 2, for a box likelihood evaluation algorithm.
Figure 10:
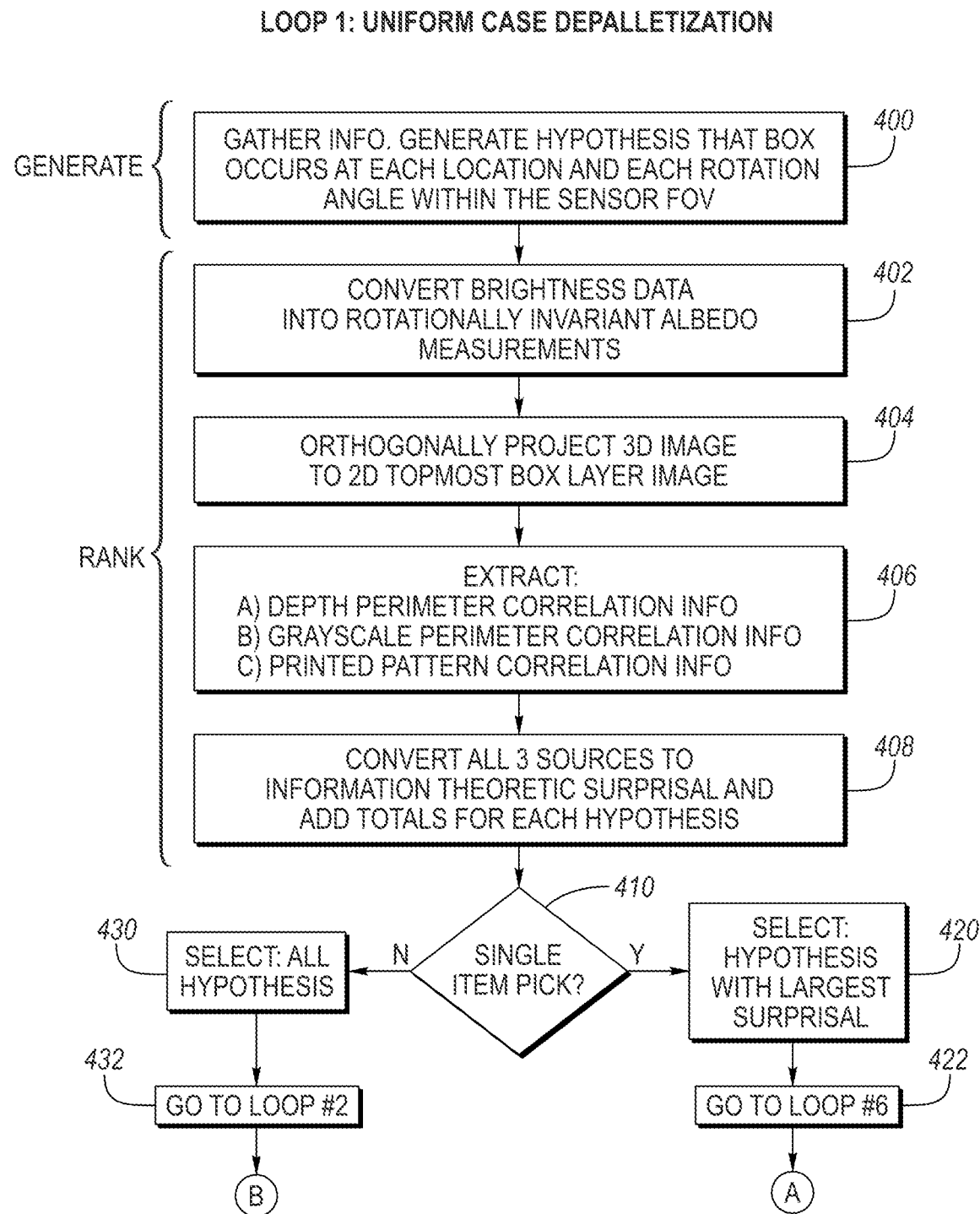
FIG. 10 is a block diagram flow chart giving detail of the algorithm in FIG. 9 for picking a single box supported on a transport structure such as the pallet of FIG. 5.

A useful generalization of the method disclosed in FIG. 9 is captured in FIG. 8. FIG. 2 shows the general method used in all the related applications being filed and co-pending with this application, as listed in the second paragraph in section titled cross-reference to related applications. FIG. 10 covers the same method as used in FIG. 9 for finding a single box packed on a uniform pallet of similar boxes but recast to explicitly display the Generate/Rank/Select organization of the method.

The series of co-pending patent applications being filed this same day cover a related sequence of inventions. A uniform case depalletizing process (FIG. 10) is an automated box picking process in which the configuration of items from which items are picked contains just one type of item. Items are picked singly, without regard to the order in which they are picked. A uniform case ordered depalletizing process (FIG. 11) is a more complex uniform case depalletizing process in which rules must be followed which regulate the order in which items may be picked from a pallet or other configuration of items. A uniform case decanting process (FIG. 12) is a yet more complex uniform case depalletizing process in which box-like items are "decanted" from a first pallet, box, conveyance, or other container of items into a second pallet, box, conveyance or other item container. This can be done either singly or as a group. The complication of a decanting process over a single box pick or singulation process lies in the necessity to manipulate box-like items as a group rather than individually. Typically, this requirement poses difficulties for automated or semi-automated systems. Uniform case decanting systems may be designed for optimal time decanting or for optimal time-space decanting (Loop 4 in FIG. 14) or for optimal time-space decanting (Loop 5 in FIG. 14). All the co-pending patent applications function to select one or more box-like items to be picked from a layer of other box-like items, they do not determine the pose of the picking tool necessary to manipulate the items. FIG. 5 illustrates the method for determining the pose of the picking tool for manipulating the selected items.

Features of at Least One Embodiment of the Invention

The system typically includes the vision-guided robot 16 and the sensor 10. The sensor 10 and the robot 16 may be mounted on support beams of a support frame structure (not shown) of the system or the robot 16 may rest on a base or factory floor as shown in FIG. 5. The sensor 10 may be mounted on the robot, or on some other fixed support structure.

The vision-guided robot 16 has the ability to pick up any item 12 within a specified range of allowable box-like items 12, using multiple-end-of-arm tooling or grippers 18. The robot 16 picks up the items 12 and orients them at a conveyor, storage tote, or other apparatus (not shown). The robot 16 may precisely position the self-supporting items 12 on a support or stage (not shown).

The robot 16 is preferably a six-axis robot 16, but alternatively may be implemented as a four-axis robot. The robot 16 is vision-guided to identify, pick, orient, and present the items 12 so that they are self-supporting on a stage. The gripper 18 may accommodate multiple part families.

The size of the gripper relative to the size of the item to be picked may influence the selection of the algorithm necessary to determine the box-like item to be picked. A gripper smaller than an individual box may only pick one box at a time and may do so without influence on neighboring box-like items, the methods of Loops 1 and 2 may be used. If the gripper subtends a larger area than a single box-like item, so that its deployment may influence neighboring items, the method of Loop 3 must be deployed to separate 'legal' picks from 'illegal' picks.

A master or system controller (FIG. 5) determines locations and orientations of the boxes 12 in the pile or stack of boxes using any suitable machine vision system having a sensor (i.e., sensor 10). Any one or more of various arrangements of vision systems may be used for providing visual information from one or more image processors (FIG. 7) to the master controller. In one example, the vision system includes two-3-D cameras 34 and illumination means that provide infrared light over fields of vision or view. In various embodiments, the light may be infrared.

The sensor 10 can be situated at a fixed location on the frame structure at a robot workstation or mounted upon the robot itself. The sensor 10 is operatively connected to the master controller via its respective image processor(s). The master controller also controls the robot 16 of the system through its robot controller. Based on the information received from the sensor 10, the master controller then provides control signals to the robot controller that actuates the robotic arm and attached gripper 18 of the robot 16 that is used in the method and system.

The master controller can include a processor and a memory on which is recorded instructions or code for communicating with the robot controllers, the vision systems, the robotic system sensor(s), etc. The master controller is configured to execute the instructions from its memory, via its processor. For example, the master controller can be host machine or distributed system. E.g., a computer such as a digital computer or microcomputer that is acting as a control module having a processor. For memory, the aforementioned computer has tangible, non-transitory computer-readable memory such as read-only memory (ROM) or flash memory. The master controller can also have random access memory (RAM), electrically-erasable, programmable, read only memory (EEPROM), a high-speed clock, analog-to-digital (A/D) and/or digital-to-analog (D/A) circuitry, and any required input/output circuitry and associated devices. The master controller can also have any required signal conditioning and/or signal buffering circuitry. Therefore, the master controller can include all software, hardware, memory, algorithms, connections, and sensors necessary to monitor and control the vision subsystem and the robotic subsystem. As such, a control method can be embodied as software or firmware associated with the master controller. It is to be appreciated that the master controller can also include any device capable of analyzing data from various sensors, comparing data, making the necessary decisions required to control and monitor the vision subsystem, the robotic subsystem, sensors, etc.

An end effector on the robot arm in FIG. 5 may include a series of grippers 18 supported to pick up the items 12. The robotic arm is then actuated by its controller to pick up the items 12 with the particular gripper, positioning the gripper 18 relative to the items 12, using the determined location and orientation from the visual position and orientation data of the particular vision subsystem including its cameras and image processor(s).

Referring now to FIG. 9, at least one embodiment of the present invention is illustrated in block diagram flow chart form. Starting at the top of the Figure, the hybrid 2D/3D sensor 10 including the 2D sensor 30 and the depth sensors 34 are shown. The 2D camera 30 generates or creates brightness/grayscale data/information in the form of pixels.

Referring now to the left-hand side of FIG. 9, brightness along the outer perimeter of a target box-like item 12 is determined at block 100, based on the pixels in the image provided by the camera 30. At block 110, a hypothesis for each pixel and item rotation is formed. Surprisals for the formed hypotheses are computed at block 120. At block 30, the surprisals from all information sources including Perimeter Brightness are combined. Then ranked at 40, and at block 50 the "best" hypothesis is selected, based on the ranked surprisals. The output of block 50 goes into block 60, wherein this output is used to command a robot to manipulate the chosen box.

Referring again to the middle part of FIG. 9, the printed pattern (i.e., for example, the "LOGO") formed on the top surface of each target box-like item 12 is determined at block 300. Blocks 310 through 60 are substantially identical to blocks 110 through 60, respectively, and, consequently, are not specifically described.

Referring now to the right-hand side of FIG. 9, distance "fall-off" along the outer perimeter of the target box-like item 12 is determined at block 200, based on the geometry implied by the voxels in the images provided by the infrared camera(s) 34. Blocks 210 through 60 are substantially identical to blocks 110 through 60, respectively, and blocks 310 through 60, respectively, are, consequently, not specifically described.

In general, the method and system of at least one embodiment of the present invention searches for items 12 like boxes—which are substantially identical. They have low variability in shape, size, color, printing, barcodes, etc. The boxes 12 may be jammed very close together, with few discernible features. The method combines both 2D and 3D imaging (grayscale and depth) to individuate the items.

As described above and below, at least one embodiment of the present invention operates on a Generate, Rank, Select (GRS) Paradigm. The embodiment is preferably one piece of software architecture (i.e. a box recognition engine) that creates the multiple products described hereinbelow in FIGS. 10-14 as "loops". Each use of this technology starts at the beginning of Loop 1 and runs through the subsequent loops to the appropriate end point product. Thus, each loop nests inside of the previous loop. The features of each of the loops is now described, and how each corresponds to a particular set of useful functionalities in commerce.

Uniform Case Depalletization Product

Finds a Single Box on a Layer-any Box

Loop 1

FIG. 10 illustrates an example in which a single box is picked from a pallet or other conveyance. At block 400, the box recognition engine generates a hypothesis for each (h,v) location in the sensor FOV (in HVZ coordinates) that a box is present with those (h,v) coordinates at a rotation angle (a) about the world Z-axis (see FIG. 5 for the world coordinate system). At block 402, which is optional, brightness data is then converted into rotationally and positionally invariant albedo measurements, allowing one to represent the scene in a scale, position and rotation invariant manner. At block 404, the hybrid 2D/3D point cloud of the pallet is converted to two-2D arrays, representing only the topmost layer of boxes on the pallet; one array represents geometric "height" data, the other represents appearance "grayscale" data.

At block 406, the box recognition engine then analyzes the image and extracts up to 3 types of measurements: 1) depth perimeter correlation info, 2) grayscale perimeter correlation info, and 3) printed pattern correlation info. As described above, the set of measurements taken at this step is descriptive, not exhaustive: other sources of information may be deployed to make other types of measurements, which are treated in the same manner as the three described here. In some cases, fewer than 3 measurements are necessary for robust system performance. This step requires that the approximate dimensions of the items are known ahead of time. This step also requires that the items on the pallet be uniform—not mixed. At block 408, all 3 sources are then converted to information theoretic surprisal, and the totals for each hypothesis are added up.

At block 410, the process followed by the box recognition engine then branches. If the box engine is configured to select a single box, irrespective of any other conditions that may be placed upon that selection, such as the relative position between the boxes or some desired pick order amongst the boxes, then control flow branches to item 420. One notes that this control branch is only possible if the pick tool is smaller than the item to be picked, which assures that any and all items may be 'legally' picked at any time. At item 420, the box recognition engine then selects the hypothesis with the largest surprisal. Having divided the box-like items on the top layer into the box to be picked, and all other boxes, and assured that any box-like item selected to be picked may legally be picked. Computation of the robot commands for picking the item then proceeds according to Loop #6 which completes the computations and actions necessary for the "Uniform Case Depalletization" product. On the other hand, if picking the single best box hypothesis is inappropriate, then Loop #2 is entered by selecting all hypotheses and subsequently proceeding via block 432. For example, this happens, if there is a particular order required to be followed when picking boxes, so that picking the single best hypothesis may not be desirable system performance.

Uniform Case Ordered Depalletization Product

Parses all Box-Like Items on a Layer

Loop 2

The purpose of Loop 2 is to enable the Box Recognition Engine to identify not just one,—but all items located on the top layer of a pallet or other transport medium, assuming the approximate dimensions of the box are known. Loop 1 (FIG. 10 above) describes a method for finding a single item. Loop 2 (FIG. 11) describes a method for finding all items on the top layer after performing Loop 1. Informally, the process of finding all items on the top layer instead of just one item is known as 'parsing.' Knowledge of the location of all boxes on a pallet layer (a parsed layer) enables the capability to pick the items according to some predetermined rule. For example, such a rule might state: "pick all boxes from the leftmost, topmost corner to the rightmost, bottommost corner. Having a parsed pallet layer also enables the option to perform further processing on the pallet. For example, decanting multiple boxes at once is enabled by Loop 2. See Loop 3.

Figure 11:
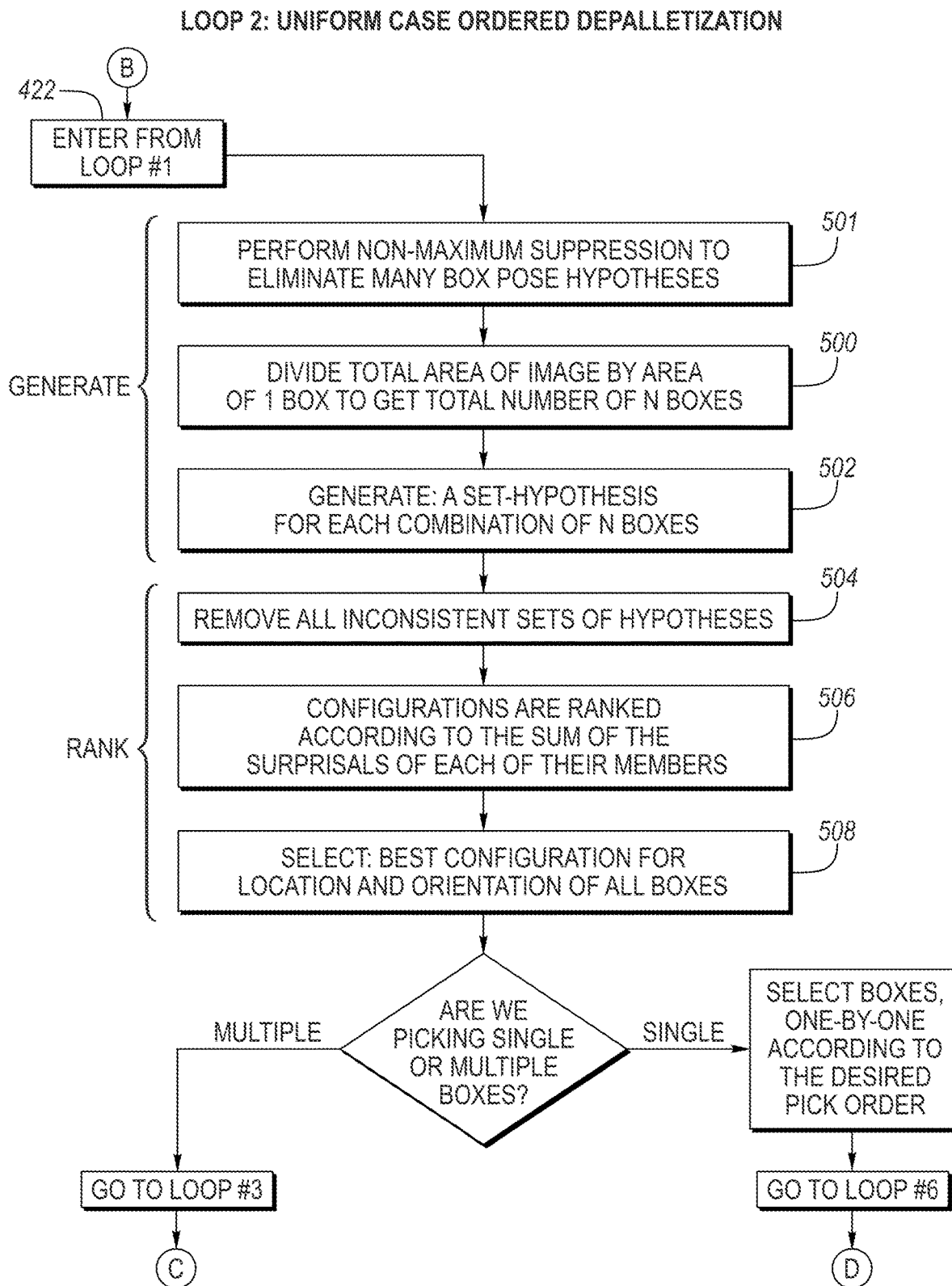
FIG. 11 is a block diagram flow chart illustrating an algorithm for picking a plurality of boxes from the pallet in an ordered fashion. This is the block diagram describing a preferred method to perform 'parsing' of the top layer of box-like items, as described below.
Figure 12:
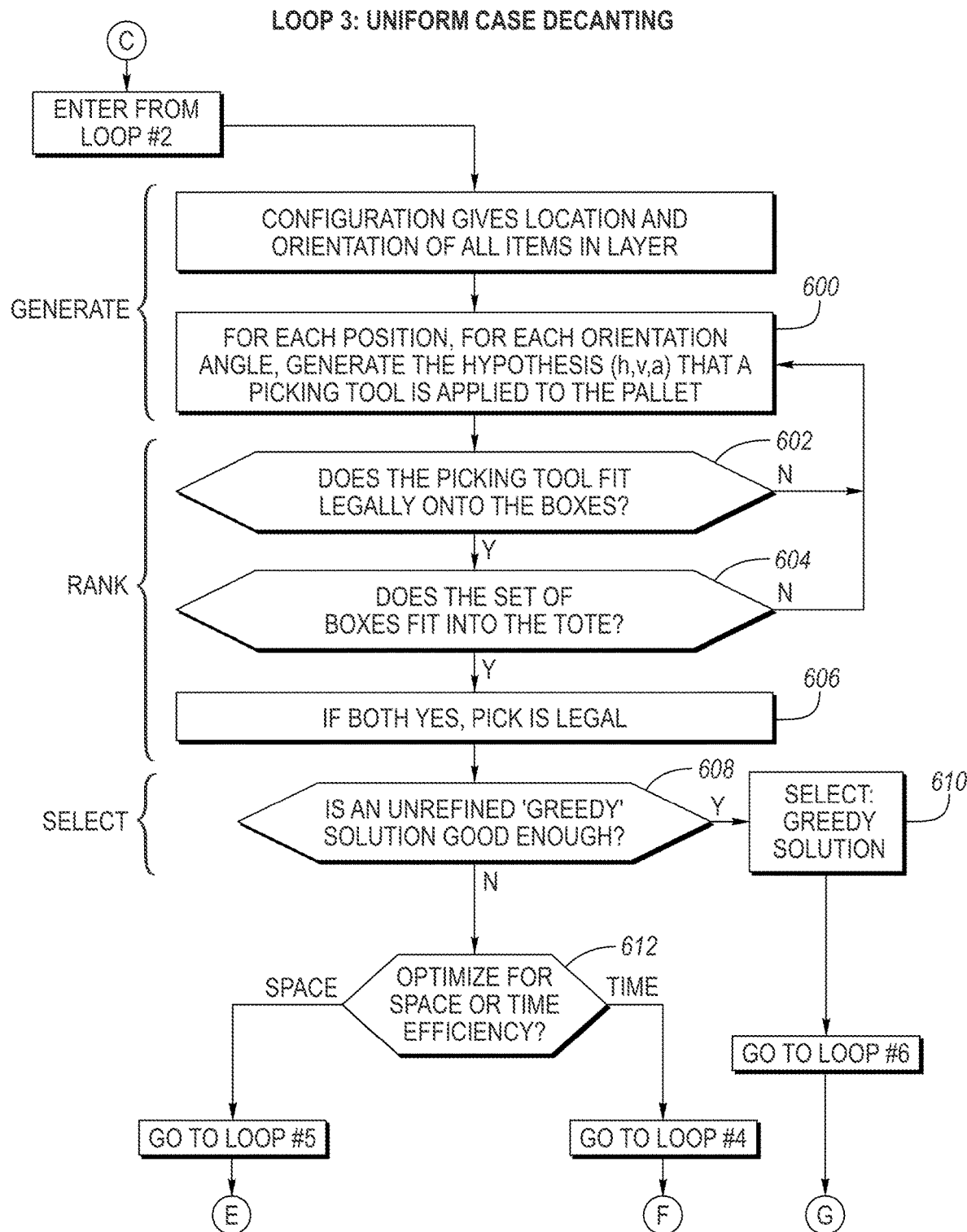
FIG. 12 is a block diagram flow chart illustrating an algorithm for decanting a plurality of boxes from the pallet. This is the block diagram describing a preferred method for determining all 'legal' picks of box-like items.

FIG. 11 illustrates an example in which multiple boxes are identified for subsequent manipulation. At block 500, the box recognition engine divides the total area of the topmost level of the image by the area of 1 box, to generate the total number of possible boxes in the FOV. At block 502, the box recognition engine is tasked with generating hypotheses for potential combinations of multiple boxes in the FOV. These hypotheses are called 'configurations'. Clearly, the number of potential configurations is extremely large. Starting from a set of M hypotheses about the location and orientation of individual boxes there are (M choose N) possible hypotheses about set membership. So many hypotheses are impossible to exhaustively enumerate, except for very small values of M, so one limits the number of enumerated hypotheses is two ways:

a. One limits the size of M by performing the mathematical morphological operation of non-maximum suppression over the surprisal-valued three-dimensional array of hypotheses. The novelty of this operation in the context of this invention is that the morphology operation is performed over a 3-dimensional lattice rather than a 1- or 2-dimensional lattice as is common in the prior art.

b. One does not generate inconsistent configurations for consideration. An inconsistent configuration is one in which hypothesized boxes are interpenetrating one another. Given a set of items of known dimension, there are methods well-known to the art for generating 'consistent' sets of items in the defined sense: see https://en.wikipedia.org/wiki/Collision_detection. Block 504 shows the step of removing inconsistent configurations from the enumeration.

Even with these limitations, the number of configurations to be considered is quite large. Finding an optimal configuration is then treated as an optimization problem over the reduced space of configuration as follows: At blocks 504 and 506, the box recognition engine proceeds to rank the logically consistent configurations according to the sum of surprisals of each item included in the set. The selection phase, at block 508, must select the configuration with the largest sum of surprisals. This exposes the all-item detection problem, as posed here, as an optimization problem of a known type: from a set of M items, choose the N items with the greatest value; this problem is substantially identical to the knapsack problem, known to the art as an NP-Hard problem. Accordingly, one adopts optimization techniques known to the art for approximating the solution to the problem: in a preferred embodiment one parallelizes a simulated annealing approach with a time-limited exhaustive enumeration approach. Other techniques will be apparent to those versed in the art. Quantum computing techniques would be useful in a future potential embodiment.

Once the best findable configuration is selected, the process followed by the box recognition engine then branches. If the box engine is configured to select single boxes for manipulation serially, according to a predetermined set of rules for selecting boxes, then the selection rule is applied to the chosen configuration to select the next box for manipulation. For example, a potential rule would be to always select the outermost corner boxes for manipulation in preference to innermost center boxes. Application of this rule requires that the position and orientation of all boxes on the topmost layer of boxes be identified as above. Note that, depending on the relative size of box-like items and picking tools, care must be taken in formulating the ordering rules; for instance, if the picking tool is larger than the boxes on a layer, it is inapt to apply a rule which selects a box for picking which lies interior to a configuration of boxes; the picking tool could not fit itself over an interior box without interfering with neighboring boxes. Having divided the boxes on the top layer into the desired box-like item and all other items, and assured that the box selected for picking may be legally picked without interference from other boxes, the process then will branch to Loop #6 for computation of the item's pick strategy and for commanding the robot which completes the computations and actions necessary for the "Uniform Case Ordered Depalletization" product. Alternatively, if boxes are to be picked by a robotic manipulator in simultaneous multiples, i.e., several boxes at a time are to be decanted, control flow branches to Loop #3 for the decanting computations.

Uniform Case Decanting Product

Generates Legal Picks for Multiple Boxes at One Time

Loop 3

Loop 3 "Decanting" begins with an optimal configuration from Loop 2. The configuration describes the location and orientation of all the boxes on the topmost layer of a pallet. This layer is assumed to contain a uniform collection of items. Loop 3 must compute subsets of boxes from the set of boxes in the configuration, which can be picked by a robotic picking tool of known dimensions. Generally, these subsets of boxes are picked to fill a tote or other small conveyance—that can fit a limited number of items. The difference between "Decanting" and "Depalletization" is that depalletization is performed by picking one item at a time from a pallet; decanting is performed by picking multiple boxes at a time ("multi-picks"). When considering decanting, as opposed to depalletization, there are three different optimization criteria for selecting which boxes should be picked to fill a tote or other conveyance:

1) The first optimization criterion is that a greedy solution is good enough. Further optimization is unnecessary. For any given configuration of boxes, there is a number 'B' representing the largest number of boxes that can be picked by the pick tool for that configuration. Any solution which finds a multi-pick for this maximum is dubbed a 'greedy' solution. Greedy solutions are computed, as described below.

2) The second criterion is to minimize the time spent unloading a pallet. The object is to find the sequence of pick operations which unloads the pallet of operations in the fewest robot cycles. The time-optimized pick sequence is usually quite similar to the 'greedy' solution but may diverge in some more-or-less important instances.

3) The third criterion is to maximize space efficiency in packing. In this case, there is a minimum fill capacity for each tote to be filled from the items on a pallet. The object is to find the sequence of robot cycles which fills totes to this designated capacity; in the event of a tie, find the shortest such sequence. Again, the space-optimized pick sequence is usually similar to the 'greedy' solution but may diverge in some instances.

Figure 13:
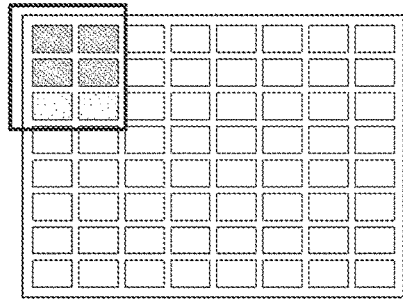
FIG. 13 is a diagram illustrating the distinction between 'legal' and 'illegal' picks in the sense used by this application, whereby a 'legal' pick results in the picking tool touching all and only those items desired to be picked.
Figure 13:
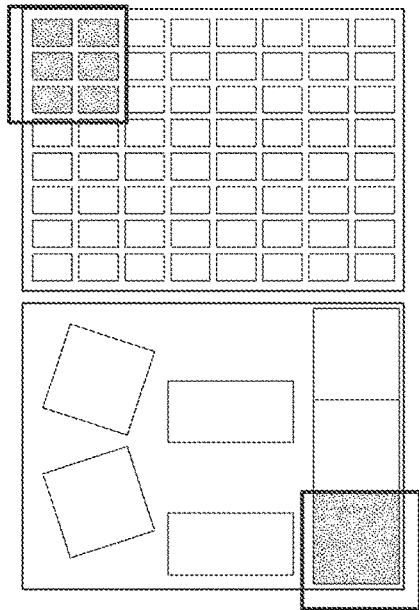
Figure 13:
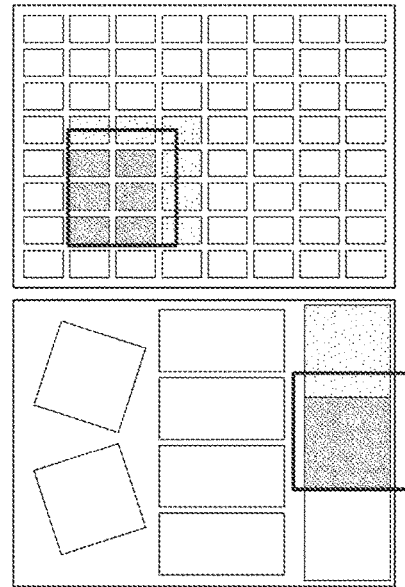

The job of Loop 3 is to find the set of all legal multi-picks for the configuration determined by the configuration, given a known pick-tool size. The definition of what constitutes a 'legal' pick is illustrated in FIG. 13. A legal pick of a set of chosen box-like items, with a pick-tool of given size and geometry, completely covers the set of chosen boxes; see FIG. 13, upper left ('legal') vs. upper right ('illegal'). Additionally, a legal pick does not partially cover any box, whether chosen or not; see FIG. 13 lower center.

Figure 20:
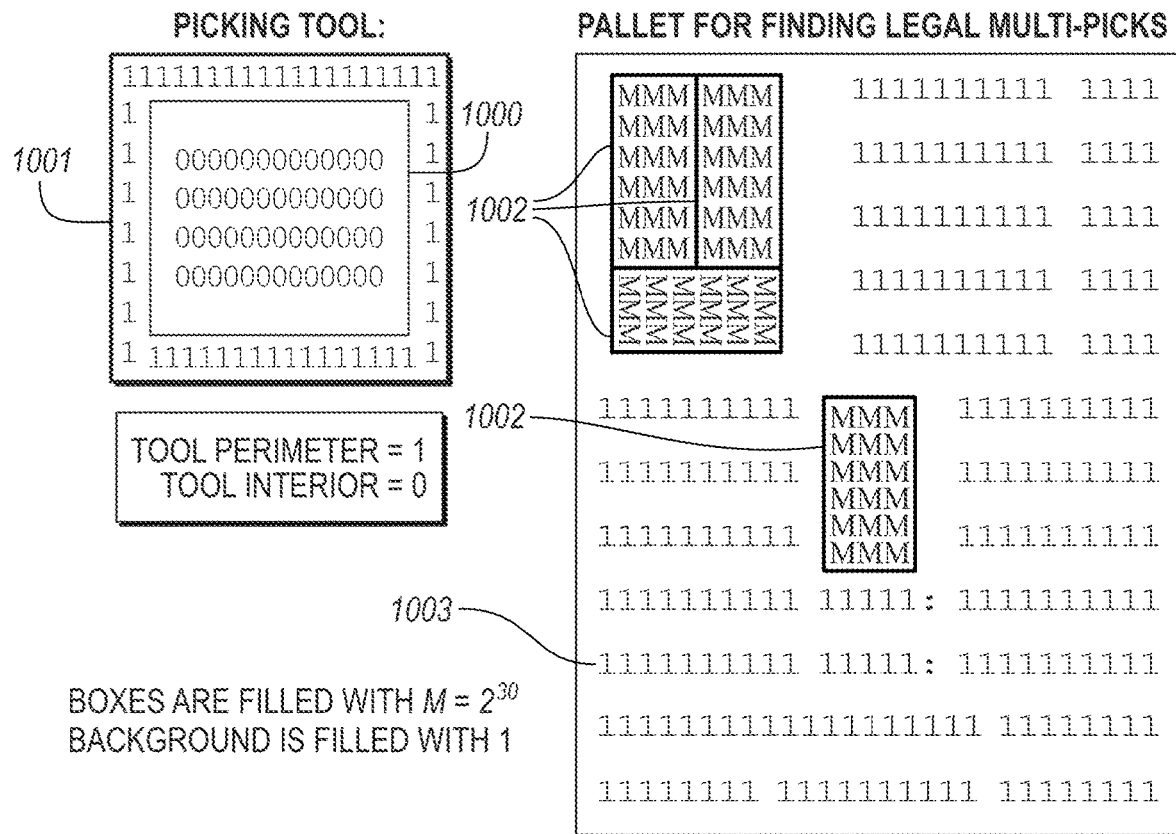
FIG. 20 is a schematic block diagram of a picking tool, a pallet and a box which illustrates a technique for computing all the legal picks from a layer of box-like items and a picking tool.

A preferred method for enumerating the legal picks is as follows: At block 1003 of FIG. 20, a 2D matrix which simulates the position and orientation of each item on a pallet's top layer is created. The matrix cells on the top layer of the pick tool are segregated into two types: those cells corresponding to occupied top-layer regions, and those cells which are not occupied on the top layer of the arrangement of items. Cells in regions 1002 within each item are filled with a larger integer value. $M=2^{30}$ will suffice. The region exterior to all box-like items 1001 is filled with a value of 1. A second matrix, with identical spatial resolution, simulates the smaller of the perimeters of the pick tool which picks the selected items and the perimeter of the tote within which the items are to be placed. The pick tool matrix 1000 is filled with 1's on its perimeter, and 0's within its interior. Each hypothesis generated by block 600 (FIG. 12) is ranked according to its three-dimensional convolution between block 1003 and 1000. It is a novelty of this approach that each 'pick hypothesis' for the pick tool's position and orientation corresponds to the value of a three dimensional convolution between the pick tool 1000 (positioned and oriented according to the (h,v,a) coordinates of the hypothesis), and the top layer representation in block 1003. Evaluation of the set of pick hypotheses for a matrix with resolution of 1000×1000 with an angle resolution of 1 degree requires the evaluation of ~3.6E8 convolutions. Standard IEEE 754 rules for multiplication and addition are followed to evaluate the convolutions described in FIG. 20. Convolutions resulting in a value larger than $M=2^{30}$ correspond to 'illegal' picks in which the pick tool does not completely enclose the items to be picked. Convolutions with numerical values less than $M=2^{30}$ represent legal picks. Refinements of this convolution method, in which three-dimensional convolutions are used to probe the space of possible pick-tool configurations, will be apparent to those versed in the art. One such refinement is described in the disclosures for Loop #6 below.

The set of legal picks is accumulated by considering each hypothesis in turn. In a preferred embodiment, legal picks are grouped into equivalence classes, wherein each equivalence class contains the same subset of items from the initial configuration. In block 606 (FIG. 12), the equivalence classes are ranked, for the purposes of Loop #3, according to the number of items in the equivalence class. The method described by FIG. 15 can be used for the purposes of Loop #3 to determine equivalence classes of hypotheses.

The identification of a 'greedy' solution for the purposes of block 610 (FIG. 12) is a simple matter of identifying the equivalence class with the greatest number of members. In a refinement, the set of all equivalence classes with the same count of members may be further ranked by their distance from the robot and the target tote to minimize travel time. If further refinement of the solution sequence for time- or space-efficiency as described below is not required, the appropriate greedy solution is chosen from the list of greedy solutions. This selection suffices to divide the box-like items on the topmost layer into the items to be picked and items not to be picked. Having divided the box-like items on the top layer into desirable and undesirable items for picking, and having assured that the selection of items constitutes a legal pick. The robot's pick placement is computed as in all other cases, via Loop #6, which completes the computations and actions necessary for the "Uniform Case Decanting" product.

Figure 19:
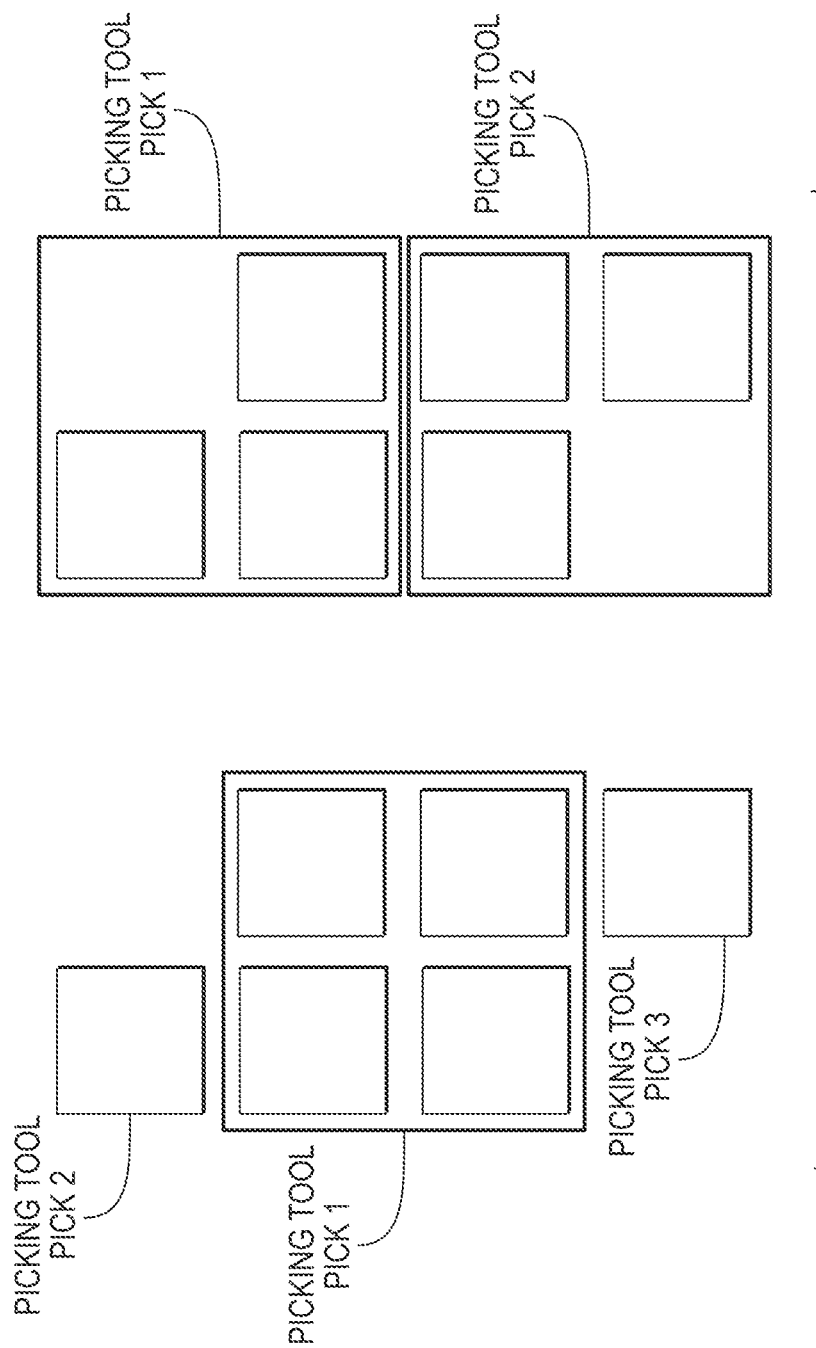
FIG. 19 illustrates schematic diagrams one of which shows an example wherein a greedy decanting strategy is suboptimal.

In some cases, it is not desirable to use a greedy solution for decanting. It may be desirable to optimize the decanting process for either space usage (e.g., filling the tote as full as possible) or for time usage (e.g., filling the tote with as few passes as possible). An illustration of why a greedy pick strategy isn't always optimal is given by FIG. 19. Starting from the given configuration, a greedy pick strategy will first choose to pick 4 items from the configuration as in the left side of the diagram, but then must use two more passes to empty the configuration of items for a total of three passes. A locally sub-optimal, but globally optimal solution is given on the right-hand side of the diagram. By choosing to pick 3 items in the first pass, the robot may complete the task of emptying the configuration in just two passes.

If Loop #3 is continued by Loop 4 or Loop 5, the set of all equivalence classes of all legal picks is input from Loop 3 to Loop 4 or Loop 5.

Optimal Time Decanting Product

Used to Empty a Pallet as Quickly as Possible

Loop 4

Figure 14:
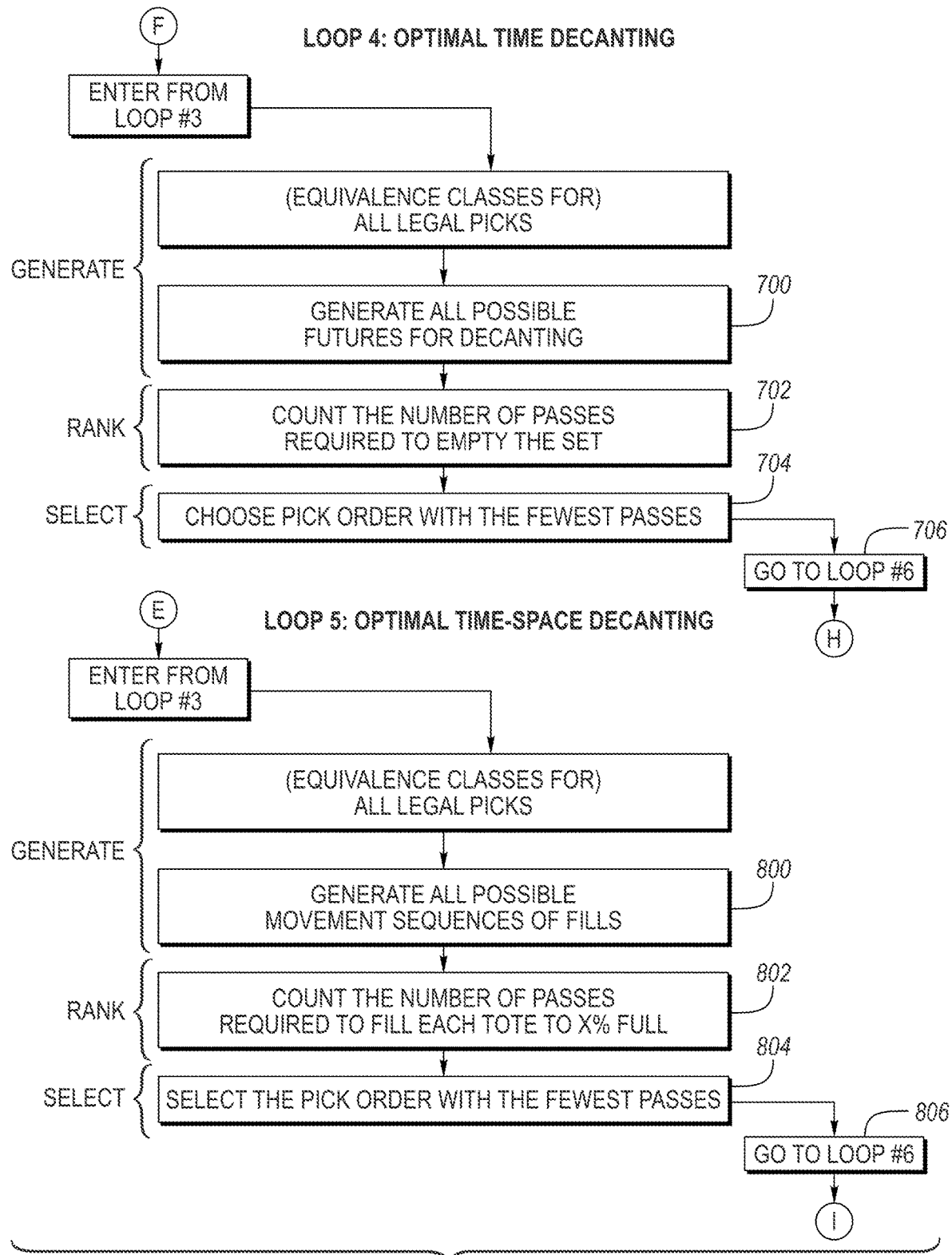
FIG. 14 illustrates a pair of block diagram flow charts of algorithms for packing a tote with a plurality of boxes. Loop 4 illustrates the method for doing so-in an optimal time-saving fashion. Loop 5 illustrates the method for doing so in an optimal space-saving fashion.

FIG. 14 (Loop 4) illustrates the method used when multiple boxes are to be decanted with the fewest robot arm movements. As a variant of the traveling salesman problem, this problem is known NP-Hard. Thus, no method exists for quickly finding optimal solutions in the general case. Conceptually, at block 700, the box recognition engine generates all possible futures for decanting; all the possible sequences of (equivalence classes of) legal picks are generated. Next, at block 702, the box recognition engine ranks these possibilities in order of greatest time efficiency. Given, two decanting sequences, the sequence which empties more items in less time is preferred. At block 704, the engine selects the pick order on the basis of the time efficiency. Finally, the robot decants the pallet. Loop 6 is entered at block 706 as usual.

This conceptual method is impractical. However, the novelty of the approach described herein lies in the identification of the Optimal Time Decanting problem as an optimization problem over sequences of equivalence classes representing legal multi-picks. With minor modification, instead of enumerating all possible sequences of legal multi-picks, only then evaluating and ranking them, one may enumerate decanting sequences one-at-a-time, using the greedy solution as an initial guess, then use standard optimization techniques such as branch and bound, heuristic methods and even exhaustive search to explore the space of possible futures—at least until computation time expires, and it is necessary to select the best findable approximate solution. Note that exhaustive search is practical for small numbers of items, and even a reasonable solution for larger number of items when applied as a breadth-first method of approximation.

As described above, this optimization problem is NP-Hard. Approximation methods for determining an approximate solution are known to the art. In a preferred embodiment approximation methods for determining an approximate solution are used in parallel. One identifies two preferred methods: The first method is a variation on exhaustive search in which the tree of possible futures is enumerated in a breath-first manner and explored to find solutions and rank them. In the second method, a series of heuristics, justified by off-line simulation and discovered by deep learning techniques, is used to rank the equivalence classes according to a weighted feature vector of properties of the equivalence classes. The method of justified heuristics is guaranteed to always find a solution in constant time. The search method is sometimes capable of outperforming the justified heuristics. Alternative methods will suggest themselves to persons skilled in the relevant arts.

Once the selection of an equivalence class is made, this selection suffices to divide the box-like items on the topmost layer into the items to be picked (those in the chosen equivalence class, which constitutes a legal pick, by construction) and items not to be picked. The robot's pick placement is computed as in all other cases, via Loop #6, which completes the computations and actions necessary for the "Optimal Time Decanting" product.

Optimal Space Decanting Product

Used to Pack a Tote for Optimal Space Usage

Loop 5

FIG. 14 (Loop 5) illustrates an example of filling a tote with multiple passes. In Loop 4 above, the task is to use the fewest number of robot motions to empty a configuration of boxes. The efficiency with which a tote is filled is not considered. In Loop 5, the task is always to fill a tote to a minimum level of fullness—the 'minimum fill percentage.' Conceptually, as above in Loop 4, at block 800, the box recognition engine generates all possible pick orders (sequences of selections of equivalence classes). These sequences are then ranked at block 802 according to how many passes are needed to achieve the required fill percentage. All pick orders which achieve the minimum fill percentage are ranked by the number of passes they require. At block 804, the pick order which achieves minimum fill percentages in the fewest number of passes is chosen.

This conceptual method is, as above, impractical. The problem statement involves the exploration of an exponential-sized configuration space. However, the novelty of the approach described herein lies in the identification of the Optimal Space Decanting problem as an optimization problem over sequences of equivalence classes representing legal multi-picks. With minor modification, instead of enumerating all possible sequences of legal multi-picks, only then evaluating and ranking them, one may enumerate decanting sequences one-at-a-time, using the greedy solution as an initial guess, then use standard optimization techniques such as branch and bound, heuristic methods, and even exhaustive search to explore the space of possible futures—at least until computation time expires, and it is necessary to select the best findable approximate solution. Note that exhaustive search is practical for small numbers of items, and even a reasonable solution for larger numbers of items when applied as a breadth-first method of approximation.

As described above, this optimization problem is NP-Hard. Approximation methods for determining an approximate solution are known in the art. In a preferred embodiment, approximation methods for determining an approximate solution are used in parallel. One identifies two computational methods: The first method is a variation on exhaustive search in which the tree of possible futures is enumerated in a breadth-first manner and explored to find solutions and rank them. In the second method, a series of heuristics, justified by off-line simulation and discovered by deep learning techniques, is used to rank the equivalence classes according to a weighted feature vector of properties of the equivalence classes. The method of justified heuristics is guaranteed to always find a solution in constant time. The search method is sometimes capable of outperforming the justified heuristics. Alternative methods will suggest themselves to persons skilled in the relevant arts.

Once the selection of an equivalence class is made, this selection suffices to divide the box-like items on the topmost layer into the items to be picked (those in the chosen equivalence class, which constitutes a legal pick, by construction) and items not to be picked. The robot's pick placement is computed as in all other cases via Loop #6, which completes the computations and actions necessary for the "Optimal Space Decanting" product.

Optimal Pose Picking Technique

For Fitting a Picking Tool Properly Over Boxes

Loop 6

Figure 15:
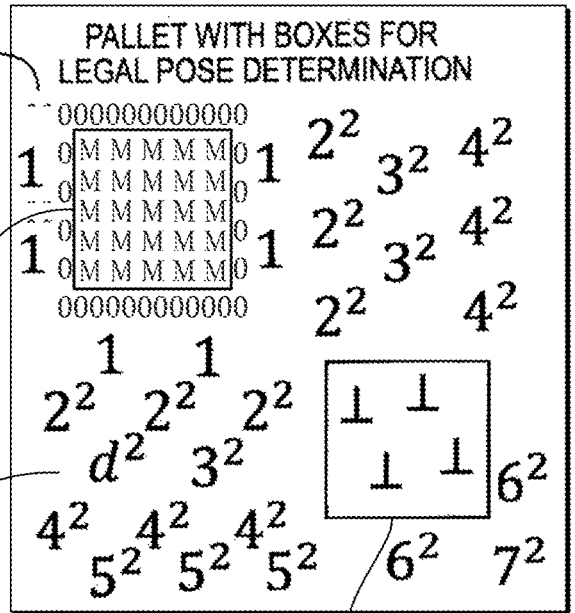
FIG. 15 is a schematic block diagram of a picking tool, a pallet and a box which illustrates a technique for computing the robot pose to execute legal picks in a case in which some items are pickable, and some are not.
Figure 16:
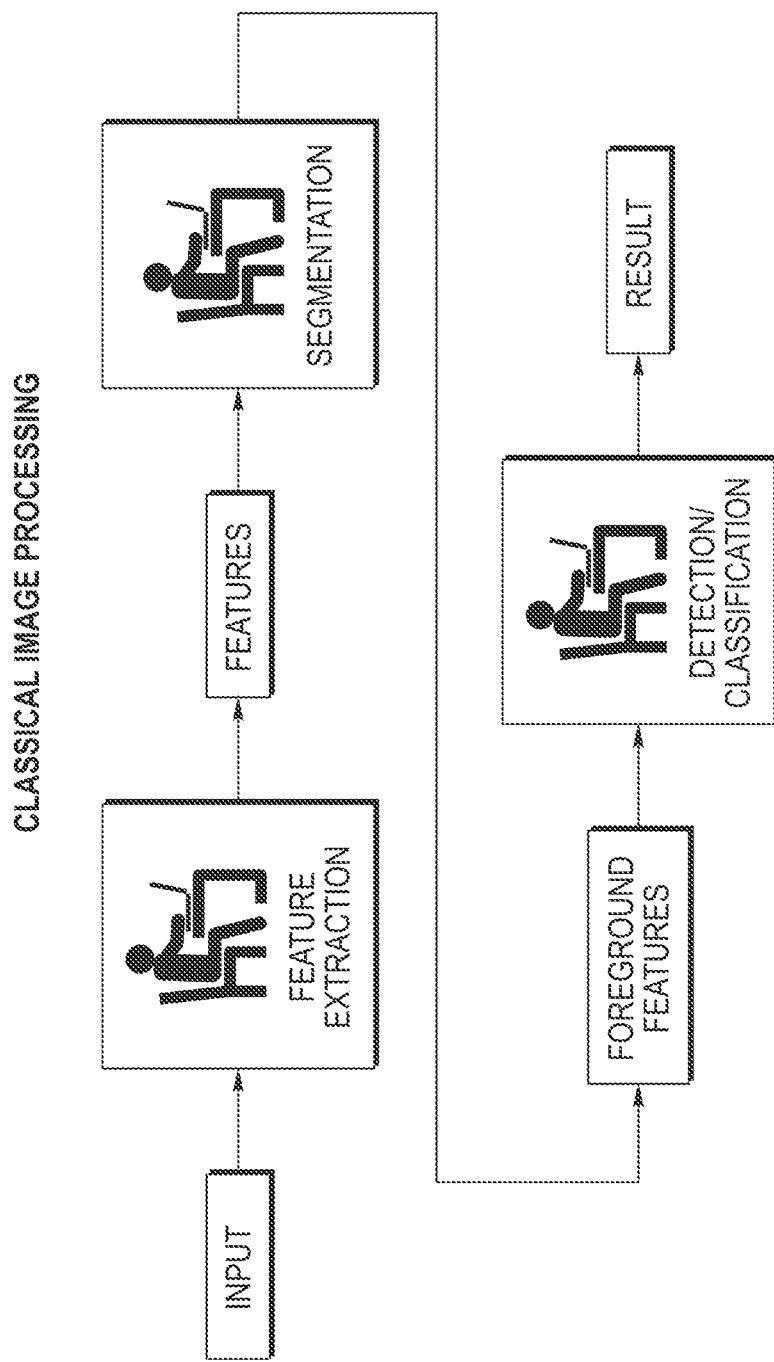
FIG. 16 is a flow chart which illustrates the human effort involved in creating classical image processing algorithms for performing tasks such as the tasks which are the subject of at least one embodiment of the present invention.
Figure 17:
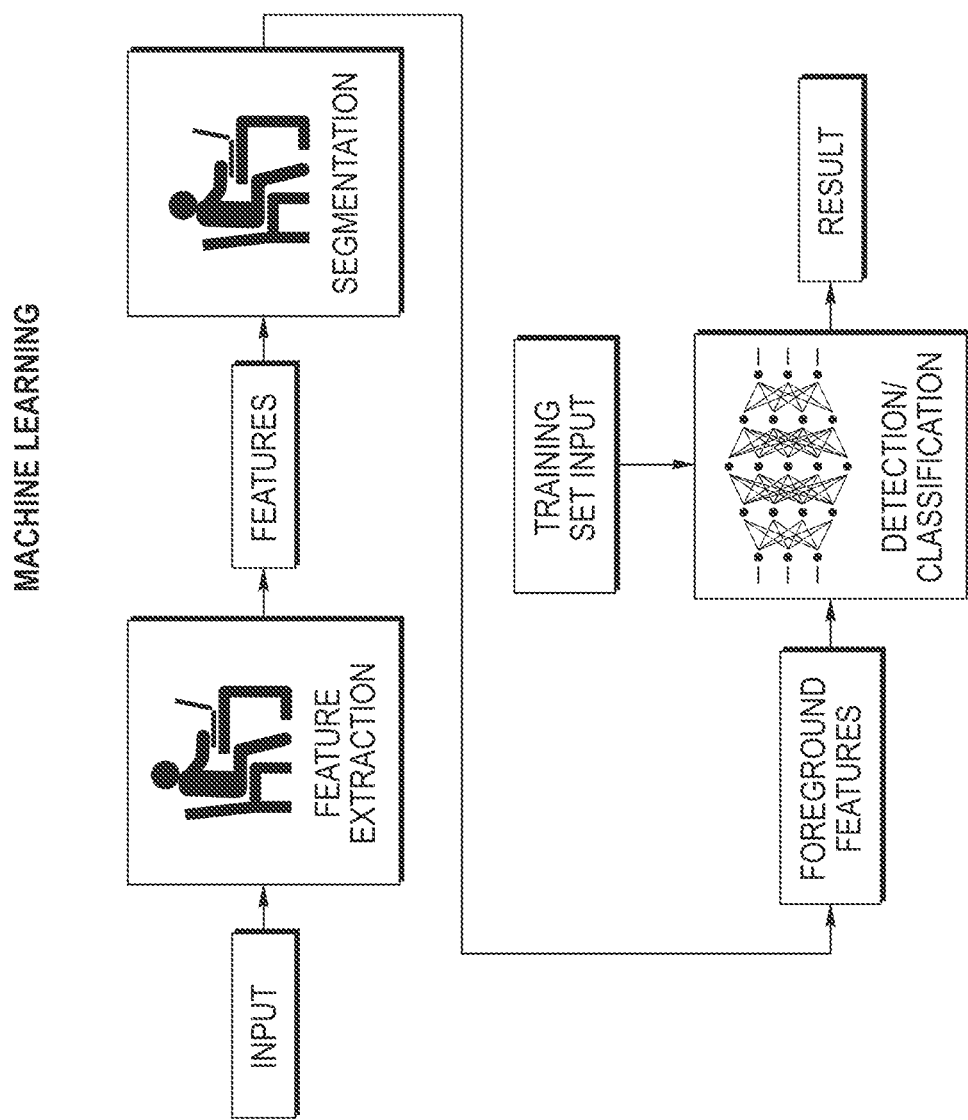
FIG. 17 is a flow chart which illustrates the replacement of human effort to develop specialized algorithms in the Detection/Classification processing phase of FIG. 16 by Machine Learning techniques using a training set.
Figure 18:
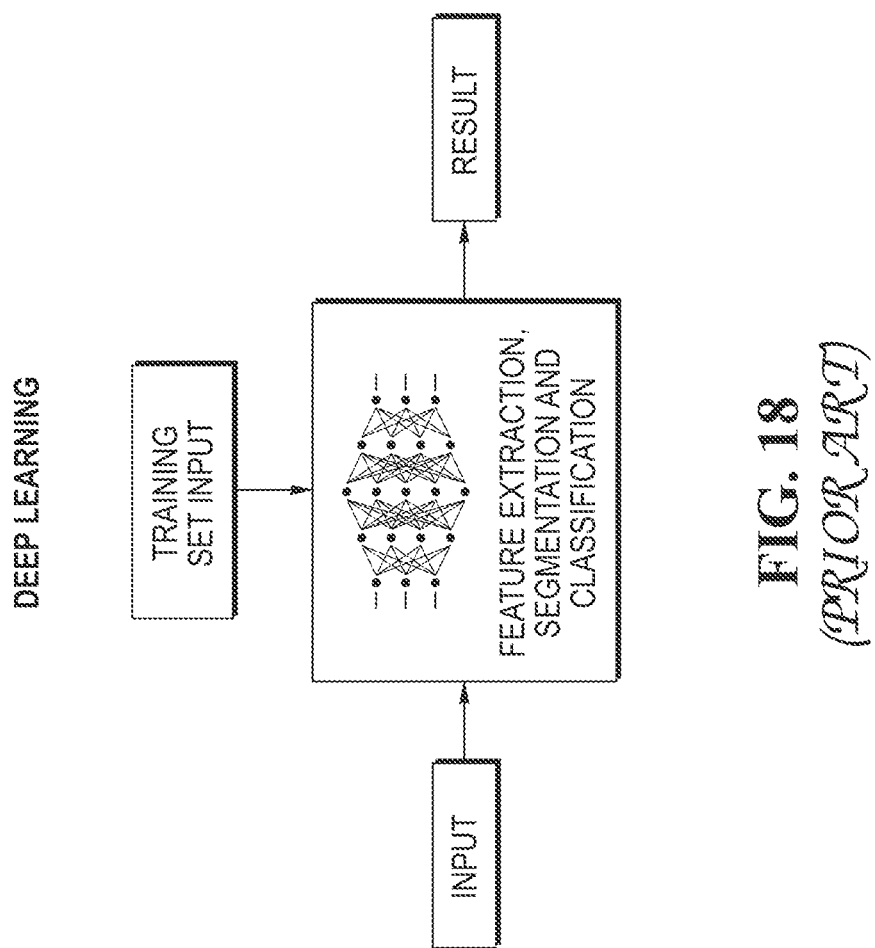
FIG. 18 is a flow chart which illustrates the replacement of human effort to develop specialized algorithms in the Feature Extraction, Segmentation, and Detection/Classification processing phase of FIG. 16 by Deep Learning techniques using a training set.

FIG. 15 is a schematic block diagram of a picking tool, a pallet, and a box which illustrates an optimal pose-picking technique or algorithm to pick up previously chosen boxes. The box recognition engine uses a two-step process to determine where to place the picking tool.

First, all possible poses of the picking tool are divided into "legal" and "illegal" poses. See FIG. 13 and FIG. 15. (A legal pose covers a grouping of contiguous boxes with a subtended area less than the size of the receiving tote and that fit the shape of the pick tool.) All covered boxes must match the shape of the pick tool and no boxes can be only partially covered.

A preferred method for ranking the 'legal' poses is to rank the legal poses by the value of their non-infinite, non-NaN convolutions. For the purposes of computational efficiency, 'infinite' in the sense used here, is interpreted as a very large integer such as $M=2^{\wedge}30$. The smaller the value, the better.

The procedure for this is as follows:

A) Separate the areas on the pallet into 'pickable' areas—which are subtended by a box-like item, or multiple box-like items desired to be picked, on the top layer of a configuration of box-like items—and—'unpickable' areas—which are subtended by undesired box-like items on the top layer of box-like items.

B) Create a 'pallet' matrix 904 representing the top layer of the pallet. Fill the area subtended by 'pickable' items 902 with a large number M. M=2^30 will suffice. M is effectively acting as infinity. Fill the area subtended by 'unpickable' items 903 with IEEE NaN.

C) Using techniques known to the art, perform a distance transform to fill the remaining interior of the pallet matrix with values representing the square of the distance from the nearest pickable area.

D) Create a 'picking tool' matrix with identical spatial resolution 900 representing the smaller of the face of a picking tool and the area of the tote to be filled. The perimeter of the picking tool matrix is filled with '1's. The interior is filled with 0.

E) Perform a three-dimensional convolution of the picking tool matrix with the pallet matrix. This convolution suffices to fill a 3D array indexed by coordinates (h,v,a) where (h,v) are the horizontal coordinates of the center of the picking tool, and (a) is the rotation of the picking tool. Use standard IEEE 754 rules for combining numerical values with non-numerical values such as NaN. See FIG. 15.

"Illegal" hypotheses are discarded from consideration. These are the hypotheses corresponding to values ≥M, or NaN values in the 3D array of convolution results. The 'legal' hypotheses, those corresponding to standard numerical values in the 3D array of convolution results, are divided into equivalence classes: the equivalence class containing no items whatsoever, and equivalence classes containing one or more of the desired box-like items. Discard all equivalence classes not containing all desired items. The items in the remaining equivalence class (which is guaranteed to exist) correspond to pick orientations which may be used to pick all selected items.

A preferred, aesthetically pleasing, method for ranking the items in the selected equivalence class is to rank them by their convolution values. Smaller is better. Other heuristic methods for ranking the pick poses may be applied depending on product specifications and customer criteria, and different selection heuristics can be programmed.

These selecting heuristic functions may vary. Some applications would prefer poses to evenly distribute the mass of boxes over the contact area of the pick tool, so the weight is balanced evenly, or centered. Others would prefer to push boxes to the edges of the pick tool. For example, an alignment heuristic will issue a score in the range of 0 to 1 representing how well-aligned the pick tool is to the set of picked boxes. The highest score represents a perfect alignment.

In some alternative embodiments of the present invention the at least one processor may be configured to subject the first plurality of ranked hypotheses to further cycles in which a second plurality of hypotheses is generated from the first set of ranked hypotheses, said second plurality of hypotheses being then ranked and selected from, potentially recursively.

An advantage of the present invention is that the present invention does not require information about a predetermined configuration of box-like objects, either to determine the configuration of boxes as presented to the system (for box-picking) or to determine the configuration of boxes to be stored in totes or other secondary storage systems (for decanting). This is a significant advantage in materials handling system which must deal with 10's of thousands of different items arranged in 10's of thousands of different configurations.

The approach disclosed herein uses a hybrid approach to vision-based artificial intelligence and statistical image processing in which the problems of detecting box-like items and measuring their locations are exposed as multidimensional optimization problems over maximum likelihood estimators using full-field geometry and appearance information from hybrid 2D/3D sensors and albedo-based lighting techniques. Information-theoretic surprisals from multiple independent sources of observations are computed, combined, and compared using likelihood maximization techniques offering the advantages of deep learning systems without the tedious training requirements and the unfortunate system opacity. The quantitative approach disclosed herein naturally exposes decision problems for grouping items for optimum path decanting as reducible to NP-Hard problems amenable to approximate solution via various annealing, backtracking, and exhaustive search methods.

An advantage of the Information Theoretic approach disclosed herein is that information from multiple sources, including, but not limited to Depth Perimeter Surprisal, Grayscale Perimeter Surprisal, Printed Pattern Surprisal, and Orthogonal Crease Surprisal, etc. (descriptions below) can be effectively weighted in the most efficient way possible through maximum likelihood estimation. The process functions by reducing all independent sources of information to commensurate "Surprisals" (information entropies) so that they may be directly compared, debugged, and visualized in a transparent, readily comprehensible fashion without requiring human-set 'weighting' parameters" contrasted with ML approaches that often contain tens of thousands of weighting parameters, so many variables that the system becomes opaque.

The method and system herein disclosed offer an alternative to the limitations of the prior art in being:

highly robust: The surprisal-based information theoretic approach enables data fusion for maximum likelihood computations: such combination of information from multiple sources enables highly robust operation of systems constructed on the basis of the disclosed principles, such systems often function for hundreds of thousands of cycles without fault or human intervention.

consistent in operation: Multi-frequency albedo-based lighting techniques enable preferred embodiments of the disclosed system to be immune from variations in ambient lighting;

capable of decanting: The disclosed surprisal-based method for statistical scene parsing and approximation methods for NP-Hard optimizations enable time- and space-optimized decanting, a significant advance in the state of the art;

flexible: The maximum likelihood estimators disclosed herein typically require a single exemplar for training. Training duration is typically less than 100 milliseconds; as compared with training times of hours or days for typical Deep Learning systems;

transparent in operation: By reducing all observations to their information content as commensurate information-theoretic surprisals, which can be compared with one another in an intuitive fashion, the reasons for any decision made by the system can be directly visualized and understood by humans;

rotationally independent: All methods herein described are implemented to gather information for both variations in position, and orientation about the vertical axis. This method contrasts favorably with some prior art, which may fail when items are rotated away from a 'standard' presentation direction.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of manipulating a target item supported on a substantially horizontal support surface supporting a configuration of substantially identical items aligned substantially perpendicular to the support surface, the method comprising the steps of:
gathering information about the configuration of items within a scene wherein the step of gathering includes the steps of illuminating at least one surface including a top surface of the items in the scene and sensing the irradiance of the scene to obtain at least one image of the geometry of the scene and at least one image of the appearance of the scene;
generating a plurality of hypotheses, each of the hypotheses describing an observation of an item in the configuration, the observations including an observation of the appearance of the item and an observation of the geometry of the item; and
ranking the hypotheses wherein the step of ranking includes the steps of computing a surprisal of the observation of the appearance of the item and a surprisal of the observation of the geometry of the item and combining the surprisals for each hypothesis.

2. The method as claimed in claim 1, wherein the step of illuminating the at least one surface illuminates one or more side surfaces of the target item to obtain geometry and appearance images of the one or more side surfaces.

3. The method as claimed in claim 1, wherein the step of illuminating includes the step of uniformly illuminating the at least one surface including the top surface of the item with light having an intensity within a relatively narrow range of wavelengths such that the light overwhelms the intensity of ambient light within the narrow range.

4. The method as claimed in claim 1, wherein the at least one image of the appearance of the scene is determined from an albedo of the target item.

5. The method as claimed in claim 1, wherein the step of sensing is performed with a hybrid 2-D/3-D sensor.

6. The method as claimed in claim 1, wherein the target item is a box-like object such as a box or a large bag.

7. The method as claimed in claim 1, wherein a pallet has the support surface.

8. The method as claimed in claim 1, wherein the step of generating includes the step of associating each element of a 3-dimensional matrix with a hypothesis regarding the presence of an item at the horizontal and vertical position, and an orientation angle determined by the coordinates of the element in the matrix.

9. The method as claimed in claim 1 wherein the plurality of hypotheses describes the observation of a printed pattern atop the item.

10. The method as claimed in claim 1, further comprising the step of selecting the hypothesis with the largest surprisal.

11. The method as claimed in claim 1, further comprising determining printed pattern information which is based on a printed pattern in the at least one appearance image and located on the top or side surfaces of the target item.

12. The method as claimed in claim 2, wherein the plurality of hypotheses describes the observation of the appearance of a vertical boundary of the target item.

13. The method as claimed in claim 2, wherein the plurality of hypotheses describes the observation of the geometry of a vertical boundary of the target item.

14. The method as claimed in claim 3, wherein the step of illuminating includes the step of polarizing the light and wherein the step of sensing senses unpolarized light and rejects the polarized light to obtain images of backscattered light.

15. The method as claimed in claim 9, wherein the step of ranking includes the steps of computing the surprisal of the observation of the appearance of the printed pattern atop the target item and combining the surprisal to the combined surprisals for the hypothesis.

16. The method as claimed in claim 10, wherein the step of selecting includes the steps of determining the location and orientation of the target item to be manipulated based on the selected hypothesis, and wherein the method further comprises the steps of providing an autonomous manipulator and a manipulating tool attached to the autonomous manipulator and utilizing the autonomous manipulator and the manipulating tool to manipulate the selected item based on the ranked hypotheses.

17. The method as claimed in claim 11, wherein at least one of the hypotheses is based on the printed pattern and wherein the step of ranking includes calculating printed pattern surprisals from the printed pattern information.

18. The method as claimed in claim 12, wherein the step of ranking includes the steps of computing the surprisal of the observation of the appearance of the vertical boundary of the target item and combining the surprisal to the combined surprisals for the hypothesis.

19. The method as claimed in claim 13, wherein the step of ranking includes the steps of computing the surprisal of the observation of the geometry of the vertical boundary of the target item and adding the surprisal to the combined surprisals for the hypothesis.

20. The method as claimed in claim 16, wherein the autonomous manipulator is vision-guided robot.

21. A system for manipulating a target item supported on a substantially horizontal support structure, the system comprising:
at least one light source configured to illuminate at least one surface including a top surface of the items in a scene to obtain backscattered illumination;
a volumetric sensor having a field of view and configured to sense the backscattered illumination to obtain at least one depth image and at least one appearance image of the item in the scene; and
at least one processor configured to determine depth information which is based on changes in depth in the at least one depth image and configured to determine grayscale information which is based on changes in brightness in the at least one grayscale image wherein the depth information and the grayscale information comprise first and second information sources respectively, and wherein for each possible voxel location in the depth and grayscale images and each possible item orientation, the at least one processor being configured to generate a hypothesis that the item appears at that voxel location with that item orientation to obtain a plurality of hypotheses and to rank the plurality of hypotheses; the at least one processor being configured to calculate surprisals from the depth and grayscale information for each of the hypotheses to obtain a plurality of surprisals from each information source; and the at least one processor being configured to determine location of the item to be manipulated based on the ranked hypotheses.

22. The system as claimed in claim 21, wherein the at least one light source is configured to illuminate one or more side surfaces of the item to obtain depth and grayscale images of the one or more side surfaces.

23. The system as claimed in claim 21, wherein the item is a box-like object such as a box or large bag.

24. The system as claimed in claim 21, wherein the at least one light source is configured to uniformly illuminate at least one surface including the top surface of the item with light having an intensity within a relatively narrow range of wavelengths such that the light overwhelms the intensity of ambient light within the narrow range to obtain the backscattered illumination.

25. The system as claimed in claim 21, wherein the at least one light source is a polarized light source and wherein the sensor includes a polarization analyzer configured to reject polarized light and to pass unpolarized light.

26. The system as claimed in claim 21, further comprising an autonomous manipulator registered with the sensor and a manipulating tool attached to the autonomous manipulator to manipulate the item based on the ranked hypotheses.

27. The system as claimed in claim 21, wherein the sensor is a hybrid 2-D/3-D sensor.

28. The system as claimed in claim 21, wherein the at least one processor is configured to compute rotation and position invariant albedo of the item based on the images wherein the brightness is the intrinsic brightness of the item.

29. The system as claimed in claim 21, wherein a pallet has the support surface.

30. The system as claimed in claim 22, wherein the at least one processor is configured to determine printed pattern information which is based on a printed pattern in the at least one grayscale image and located on the top or side surfaces of the item.

31. The system as claimed in claim 26, wherein the autonomous manipulator is a vision-guided robot.

32. The system as claimed in claim 30, wherein at least one of the hypotheses is based on the printed pattern and wherein the at least one processor is configured to calculate a printed pattern surprisal from the at least one hypothesis.

* * * * *